(12) United States Patent
Ayyagari et al.

(10) Patent No.: US 7,430,601 B2
(45) Date of Patent: Sep. 30, 2008

(54) SYSTEMS AND METHODS FOR NETWORK COORDINATION WITH LIMITED EXPLICIT MESSAGE EXCHANGE

(75) Inventors: Deepak Ayyagari, Vancouver, WA (US); Wai-Chung Chan, Redmond, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 11/089,792

(22) Filed: Mar. 23, 2005

(65) Prior Publication Data

US 2005/0170835 A1    Aug. 4, 2005

Related U.S. Application Data

(63) Continuation of application No. PCT/US2004/036799, filed on Nov. 5, 2004.

(60) Provisional application No. 60/573,353, filed on May 21, 2004, provisional application No. 60/537,492, filed on Jan. 19, 2004, provisional application No. 60/518,574, filed on Nov. 7, 2003, provisional application No. 60/518,237, filed on Nov. 7, 2003, provisional application No. 60/518,224, filed on Nov. 7, 2003, provisional application No. 60/518,036, filed on Nov. 7, 2003.

(51) Int. Cl.
*G06F 15/16* (2006.01)
*H04J 3/16* (2006.01)

(52) U.S. Cl. .................. 709/225; 370/468; 709/235
(58) Field of Classification Search ............... 709/235, 709/225; 370/444, 468
See application file for complete search history.

(56) References Cited

U.S. PATENT DOCUMENTS

| | | | |
|---|---|---|---|
| 6,006,271 A * | 12/1999 | Grabiec et al. | 709/235 |
| 6,400,819 B1 * | 6/2002 | Nakano et al. | 379/229 |
| 6,480,506 B1 | 11/2002 | Gubbi | |
| 6,795,418 B2 * | 9/2004 | Choi | 370/336 |
| 7,110,380 B2 * | 9/2006 | Shvodian | 370/336 |
| 2003/0012166 A1 * | 1/2003 | Benveniste | 370/338 |
| 2003/0012176 A1 * | 1/2003 | Kondylis et al. | 370/348 |
| 2003/0161340 A1 * | 8/2003 | Sherman | 370/445 |
| 2003/0174665 A1 * | 9/2003 | Benveniste | 370/317 |
| 2003/0181165 A1 * | 9/2003 | Sugar et al. | 455/69 |
| 2003/0224787 A1 | 12/2003 | Gandolfo | |
| 2004/0013135 A1 * | 1/2004 | Haddad | 370/493 |
| 2004/0053621 A1 * | 3/2004 | Sugaya | 455/450 |
| 2004/0058686 A1 * | 3/2004 | Odman | 455/450 |
| 2004/0125786 A1 | 7/2004 | Fuchs | |

* cited by examiner

*Primary Examiner*—Andrew Caldwell
*Assistant Examiner*—Benjamin A Ailes
(74) *Attorney, Agent, or Firm*—Krieger Intellectual Property, Inc.; Scott C. Krieger

(57) ABSTRACT

Embodiments of the present invention comprise methods and systems for coordination of interfering network devices.

10 Claims, 24 Drawing Sheets

Algorithm to reconcile Beacons when a QoSC is in State 1. (Part 2 of 4)

Algorithm to reconcile Beacons when a QoSC is in State 1. (Part 3 of 4)

Algorithm to reconcile Beacons when a QoSC is in State 2. (Part 2 of 3)

SYSTEMS AND METHODS FOR NETWORK COORDINATION WITH LIMITED EXPLICIT MESSAGE EXCHANGE

CROSS-REFERENCE TO RELATED APPLICATIONS

This application is a continuation of International Patent Application No. PCT/US2004/36799 filed Nov. 5, 2004 which claims the benefit of U.S. Provisional Patent Applications: No. 60/518,036 filed Nov. 7, 2003 entitled "OFDMA (FDM+TDM) Schedulers for OFDM PHY's"; No. 60/518,036 60/518,224 filed Nov. 7, 2003 entitled "Reconfiguration of Sub-Channels in an OFDM System"; No. 60/518,237 filed Nov. 7, 2003 entitled "Network Bandwidth Optimization For Channel Estimation Measurements"; No. 60/518,574 filed Nov. 7, 2003 entitled "Selection Of Fixed Versus Dynamic Modulation Settings In An OFDM System"; No. 60/537,492 filed Jan. 19, 2004 entitled "Resource Coordination Architecture For Neighboring Networks"; and No. 60/573,353 filed May 21, 2004 entitled "System Design Document For Neighbor Network Operations."

BACKGROUND OF THE INVENTION

In situations where multiple logical networks share a common communication medium or channel, the networks may compete for access to the channel (i.e., they compete for bandwidth). In the absence of any coordination between the networks, they can destructively interfere with one another, reducing capacity utilization and the bandwidth (BW) available to stations within any network.

The scenario described above arises when neighboring homes in a residential neighborhoods or apartments deploy local area networks within their individual dwellings. Often the networks share the channel, as is the case in wireless and in powerline networks. This scenario requires a method to allow interfering networks to coordinate with one another.

The coordination problem may be solved by contention access protocols that are employed by all interfering stations within multiple networks sharing a medium. Contention access protocols have been shown to be inefficient in providing QoS guarantees to AV and streaming applications which are increasingly popular.

In some cases, a central controller arbitrates among the multiple networks in deciding how the total available BW is apportioned. This centralized decision making scheme can cause large delays and incur heavy messaging overhead as the number of neighboring networks grows.

BRIEF SUMMARY OF THE INVENTION

Embodiments of the present invention comprise systems and methods for neighbor network coordination that require little or no explicit message exchanges.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
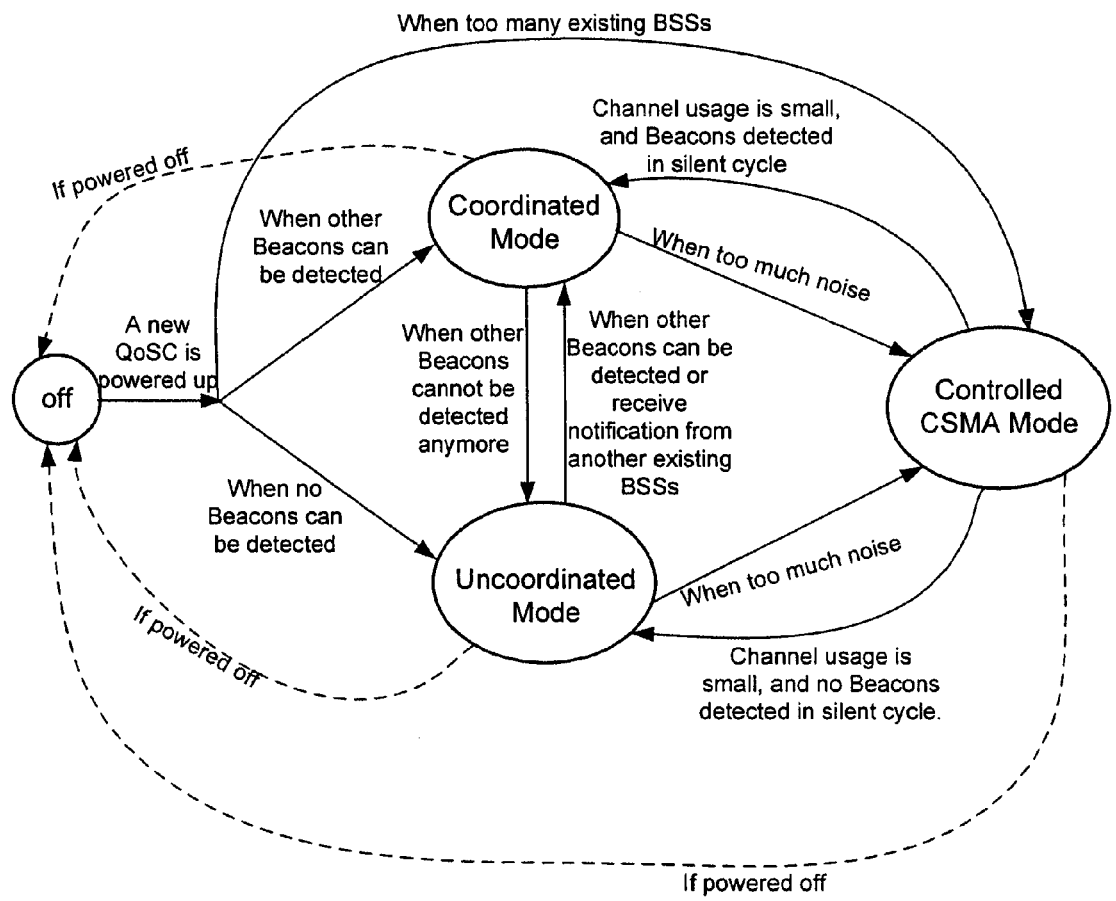
FIG. 1 is an exemplary coordination mode transition diagram.

Embodiments of the present invention comprise systems and methods for neighbor network coordination that require little or no explicit message exchanges. Some embodiments utilize a distributed coordination approach. The advantages of a distributed approach include no chaining effect where a network has to coordinate with networks multiple hops away and no central authority that arbitrates among network devices. These distributed methods may improve capacity over contention access protocols. Additional advantages and improvements can be achieved by limiting or eliminating message exchanges between neighbor networks, namely (1) overhead used by message exchange is reduced which can lead to higher BW efficiency, (2) issues related to collision and retransmission of messages are resolved (e.g., retry timer is not required), and (3) a faster response time in coordination.

Embodiments of the present invention are applicable in scenarios where each network generates its own Beacon periodically and the BW assignments for each network are carried in the Beacon. In these embodiments, a network will decode the Beacon of each of its interfering neighbors to find out the existing BW assignments. It will then adjust its own BW assignments to coordinate with its neighbor networks, to request for additional BW, or to release its reserved BW.

In some embodiments, basic network operations (e.g., network establishment, BW request, and BW release) can be supported by the distributed approach without message exchange. If advanced network coordination features (e.g., shifting the system timing of an existing network, dynamically adjusting system parameters) are desired, a limited set of messages may be exchanged in some embodiments.

Embodiments of the present invention comprise a distributed method for coordination among multiple interfering networks that requires little or no message exchange.

In some embodiments a network model is used where each network has a controlling authority (QoS Controller or QoSC). In these embodiments there may be one instance of a QoSC in each network. The QoSC manages the activities of devices within its network and performs functions such as BW allocation to connections.

The QoSC of each network may transmit a Beacon periodically. The Beacon may comprise the BW assignments (among other things) for the network. All devices in a network will decode the Beacon of the network and find out the BW assignments. The Beacon is also decoded by other QoSCs in the INL to coordinate their BW assignments. For example, the Beacon may specify that a particular time interval and/or a set of frequencies is allocated exclusively to some devices, or it may specify that a time interval is to be shared by all the devices using some contention access protocol, or it may specify that a time interval is not to be used by any devices, etc.

In some embodiments the period for transmitting the Beacons is the same for all the neighbor networks. In these embodiments, a time domain multiple access scheme may be used where the networks share bandwidth by operating in different segments of a time frame.

In some embodiments, the QoSC of each network, at network initialization, determines its Interfering Network List (INL) by decoding all existing Beacons. It may also monitor existing Beacons to update its INL, if necessary, as existing neighboring networks are shut down and new neighboring networks are established.

Embodiments of the present invention may comprise a time frame, as instantiated by the QoSC and observed by all devices in the network controlled by the particular QoSC. This time frame may comprise five regions:

1. Beacon Region: Beacons are control messages that identify the frame configuration and the BW assignments within the time frame to multiple networks and to devices within a given network. Each QoSC must transmit a Beacon to devices in its network to inform them of the frame configuration to follow. Neighbor networks that have the same system timing periodically transmit their Beacons in a time interval called the Beacon Region. Neighbor networks that have the same system timing may be referred to as a "Group" of networks.) The Beacon Region may comprise a certain number of Beacon slots. The duration of each Beacon slot is enough for the transmission of a Beacon. When a QoSC establishes its network, it finds a vacant Beacon slot to use in such a way that its Beacon will not collide with that of its neighbor networks. The same Beacon slot may be used by that QoSC in the future.

2. Protected Region: It is possible that two or more separate Groups of BSSs exist with different system timing between them. When a QoSC detects the existence of another Group with a different timing, it may specify a Protected Region for the same interval when the Beacon Region of the other Group is transmitted. Stations in a network are not allowed to transmit in a Protected Region.

3. CSMA Region (or Contention Period): This is a period when multiple stations use a contention access protocol to share the medium. In this document, the term "CSMA Region" is used to describe a region wherein any one or more of many contention access protocols is used to coordinate network traffic. In some embodiments, a Carrier-Sense Multiple Access (CSMA) protocol may be used. In other embodiments, a different contention access protocol may be used. A network may have one or more Contention Periods or CSMA Regions. CSMA Regions of one network cannot overlap with the Reserved Region of a network in its INL. Each network may utilize at least one CSMA Region to carry such control messages as BW request, Authentication request, etc.

4. Reserved Region (or Contention-Free Period): This is a period when only stations that have explicit authorization from their QoSC are allowed to transmit. A QoSC may ensure that transmissions in the Reserved Region are contention-free. Networks in the INL shall specify a Stayout Region in the same time interval.

5. Stayout Region: This is a period within the time frame when all stations in a network that have been assigned a stayout region are instructed by the QoS to remain silent. They must not use a contention access protocol or a contention free access protocol. A Stayout Region is assigned to avoid conflicts with a device or network in the INL that has been assigned a Reserved Region in the same time interval.

The Beacon of each network may also carry information about the occupancy of the Beacon slots in the Beacon Region. From this information, a new QoSC may choose a vacant Beacon slot to transmit its new Beacon. In some embodiments, a certain number of Beacon slots may be reserved for the transmission of Beacons. In other embodiments, the Beacons can be transmitted in any time interval that is not being reserved.

A Beacon may be used to carry BW assignment information to all stations in a network. All stations in a network decode the Beacon from their QoSC and observe the time schedule indicated therein.

A QoSC may also decode the Beacons of the networks in its INL. When constructing its version of the time frame (i.e. its BW assignments), the QoSC may make sure its BW assignments are "compatible" with BW assignments of the neighbor networks in its INL. For example, a Stayout Region may be specified by the QoSC if one of the neighbor networks has specified a Reserved Region in the same interval. These rules, when used along with the INL, allow re-use of capacity among networks that don't interfere with one another even though they share a common communication channel.

The use of a Beacon to convey BW assignments to networks in the INL may decrease or eliminate the need for message exchange. Algorithms are utilized in some embodiments to set the BW assignments to coordinate with other networks in the INL.

Some embodiments of the present invention comprise a distributed model for coordination among multiple neighboring networks based on Interfering Network Lists. These embodiments do not require a central authority to arbitrate between multiple networks.

Some embodiments of the present invention comprise BW assignments inside the Beacon. These assignments may be used by neighbor networks in the INL for coordination purposes. These embodiments comprise methods and systems for establishing new networks and for sharing BW with networks in an INL without message exchanges.

Some embodiments of the present invention comprise a distributed coordination mechanism that bases decision making on data maintained in an INL and does not require networks that are multiple hops away to coordinate with one another.

Some embodiments of the present invention comprise a coordination mechanism that allows networks to re-use portions of time intervals that are already in use by non-interfering networks.

Embodiments of the present invention may be used in conjunction with networks that comply with established standards, such as IEEE 802.15.3, IEEE 802.11 or HomePlug Powerline Communications standards. These standards and their defining documents are hereby incorporated herein by reference.

Coordinated Mode Embodiments

In some embodiments of the present invention, a new QoSC may establish a BSS in the Coordinated Mode if it can detect Beacons reliably from at least one existing BSS. The new QoSC may acquire the timing of the existing BSS(s), and join the existing BSS(s) to form a Group. A Group (of BSSs) is defined as a collection of one or more BSSs with the same system timing. The Beacon Regions of each BSS in the same Group are coincidental.

In these embodiments, the Schedule Information of each Beacon in the Group should be "compatible" with the others. For example, if a BSS specifies a Reserved Region and an interfering BSS specifies a Stayout Region in the same interval, then the two schedules are said to be compatible. On the other hand, if a BSS specifies a Reserved Region and an interfering BSS specifies a CSMA Region, then they are said to be incompatible. Exemplary rules of determining whether two schedules are compatible are explained below.

Figure 7:
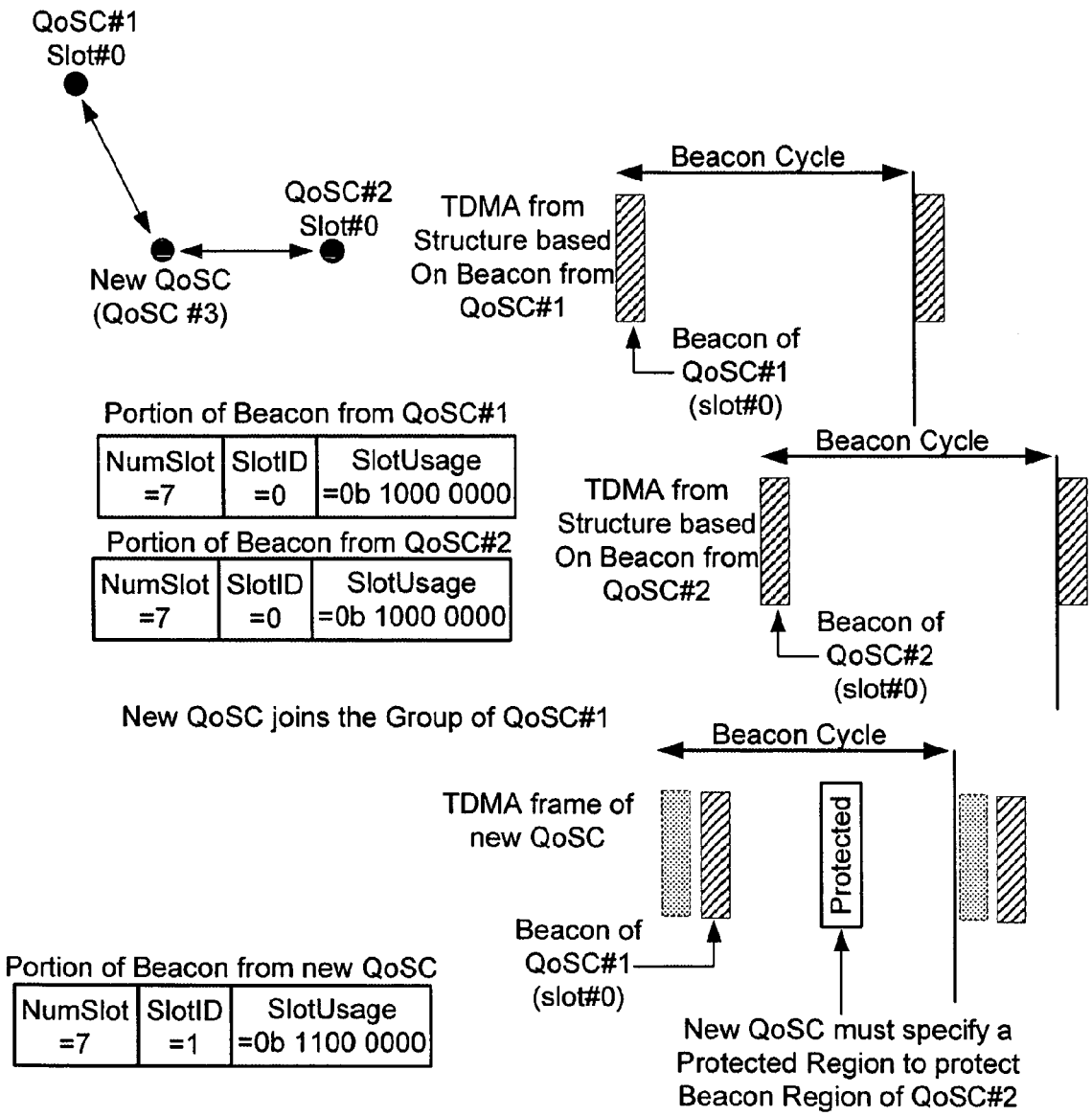
FIG. 7 is a chart showing an exemplary network scenario with two BSS groups.

In some embodiments, it may be possible to have two or more Groups of BSSs in the same vicinity, as illustrate in FIG. 7. BSSs in one Group have a different system timing than the BSSs in the other Group. However, the schedules of one BSS must still be compatible with each interfering BSS independent of whether the two BSSs are in the same Group or not.

Communications between different BSSs may be carried out by using the Schedule Information of the Beacons.

Overview of an Exemplary TDMA Frame Structure

In some embodiments of the present invention, an exemplary TDMA frame may comprise the following five regions.

Beacon Region: The Beacon Region consists of a certain number of Beacon slots. The duration of each slot may be made equal to the sum of the duration of a Beacon PDU and a Beacon Inter-Frame Spacing (BIFS). Each QoSC may transmit a Beacon in one of the Beacon slots every Beacon Cycle. When several BSSs are in the same Group, their Beacon Regions may be aligned with each other and interfering BSSs may use different slots to transmit their Beacons. CSMA Region or Contention Period: Stations in a BSS are allowed to contend for the channel with other stations using CSMA/CA or another contention access protocol in this region. Reserved Region (Contention-Free Period): A Reserved Region may be used for contention-free allocations made by a QoSC to stations within a BSS. Only stations that have been assigned an allocation can transmit in this region. All other stations in the same BSS shall not transmit in the same interval. In addition, all other interfering BSSs shall be assigned to a Stayout Region during an interfering station's Reserved Region.

Stayout Region: A BSS is assigned a Stayout Region if one or more of its interfering BSSs have specified a Reserved Region or a Protected Region (to be defined next) in the same interval. Stations in the BSS are not allowed to transmit in a Stayout Region. Note that it is possible to have two non-interfering BSSs specify a Reserved Region in the same interval. This results in frequency reuse with a higher total capacity.

Protected Region: When a QoSC detects the existence of another Group with a different timing, it may specify a Protected Region for the same interval where the Beacon Region of the other Group is located. Stations in a BSS are not allowed to transmit in a Protected Region.

In some embodiments the length of a Beacon Cycle may be a constant.

Figure 4:
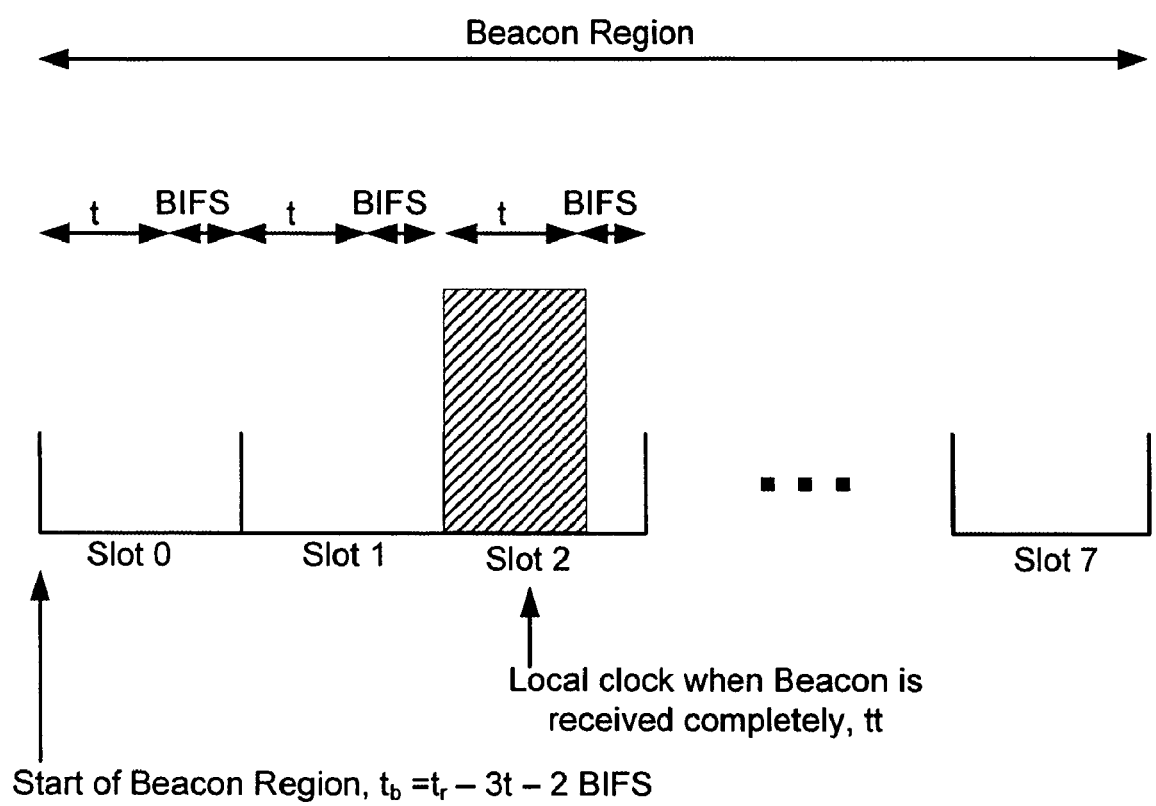
FIG. 4 is a chart showing an exemplary Beacon Region.

In some embodiments, the bandwidth assignments for a BSS may be specified in the Beacon as a series of Schedule Information. In these embodiments, each Schedule Information may comprise the following fields:

TYPE: The TYPE field indicates the allocation type of the Schedule Information. It can be equal to Reserved, CSMA, Stayout, or Protected. (Note that it may not be necessary to specify the Beacon Region because its location can be derived from other information in the Beacon. See FIG. 4.)

LID: If the TYPE field is equal to Reserved, the LID field indicates which link is granted the allocation.

STARTTIME: The STARTTIME field specifies the start time of the Schedule Information, relative to the end of the Beacon Region. (If the start time of a schedule is always equal to the end time of the previous schedule, then this field is not needed.)

ENDTIME: The ENDTIME field specifies the end time of the Schedule Information, relative to the end of the Beacon Region.

Exemplary Procedures for Establishing a New Network

When a new QoSC is powered up, it may perform the following steps.

Scan for Beacons and decode Beacons.

If too many BSSs are detected,
  The new QoSC may form a new BSS in the Controlled CSMA Mode.

Else if Beacons can be detected and decoded reliably,
  The new QoSC may form a new BSS and join one of the existing Group(s) of BSSs in the Coordinated Mode.
  The new QoSC may maintain the same timing as the Group it has decided to join. It may also select a free Beacon slot in the Beacon Region to transmit its new Beacon.
  The schedules inside the Beacons of the new BSS may be compatible with the schedules of all other existing Beacons (from all the Groups).

Else if Beacons cannot be detected and decoded reliably (i.e., because there are no other existing BSSs, or because Beacons from existing BSSs interfere with each other such that the new QoSC cannot detect and decode any Beacons reliably),
  The new QoSC may establish a new independent BSS in the Uncoordinated Mode.
  It may detect an idle interval using CSMA and start transmitting its Beacons in that interval once every Beacon Cycle.
  The new QoSC may maintain its own timing and decide its schedules independently.

Exemplary Slot Structure of Beacon Region

In some embodiments of the present invention, an existing QoSC may transmit information about the slot structure of the Beacon Region so that a new QoSC can join the system. That information may comprise:

Number of slots in the Beacon Region.

Slot ID used by the current QoSC to transmit this Beacon.

List of available slots in the Beacon Region from the point of view of the current QoSC.

In some embodiments, the number of slots in the Beacon Region may be fixed. Any reasonable number of Beacon slots can be used. If the number of slots is fixed at 8, a total of 2 bytes are required to specify the slot structure of the Beacon Region using this exemplary method. If the number of slots is fixed at 16, a total of 3 bytes are required. A limited set of messages can also be defined to dynamically negotiate between QoSCs the number of Beacon slots in the Beacon Region.

Figure 2:
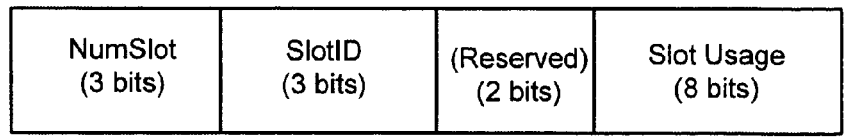
FIG. 2 is a chart showing exemplary Beacon PDU fields.

One way to specify the above information is to have a Beacon PDU comprising the following fields as shown in FIG. 2.

NumSlot (3 bits): The NumSlot field is equal to the number of slots in the Beacon Region minus one. For example, if there are 6 slots in the Beacon Region, then NumSlot=5. Since, in some embodiments, the number of slots in the Beacon Region may be assumed to be fixed at 8, the NumSlot field may be fixed at 7.

SlotID (3 bits): The SlotID field indicates the slot number used by the current Beacon. The valid range is between 0 and 7 for 8 slot embodiments. The number of slots remaining in the Beacon Region after the current Beacon can be determined from the SlotID field. For example, if SlotID=1, then there are 6 more slots remaining in the Beacon Region after the current Beacon.

SlotUsage (8 bits): This bit map indicates whether each of the 8 slots in the Beacon Region is available or not. "0" may indicate that a slot is free. "1" may indicate that a slot is used.

Exemplary Selection of a Group to Join and a Beacon Slot to Use

Figure 3:
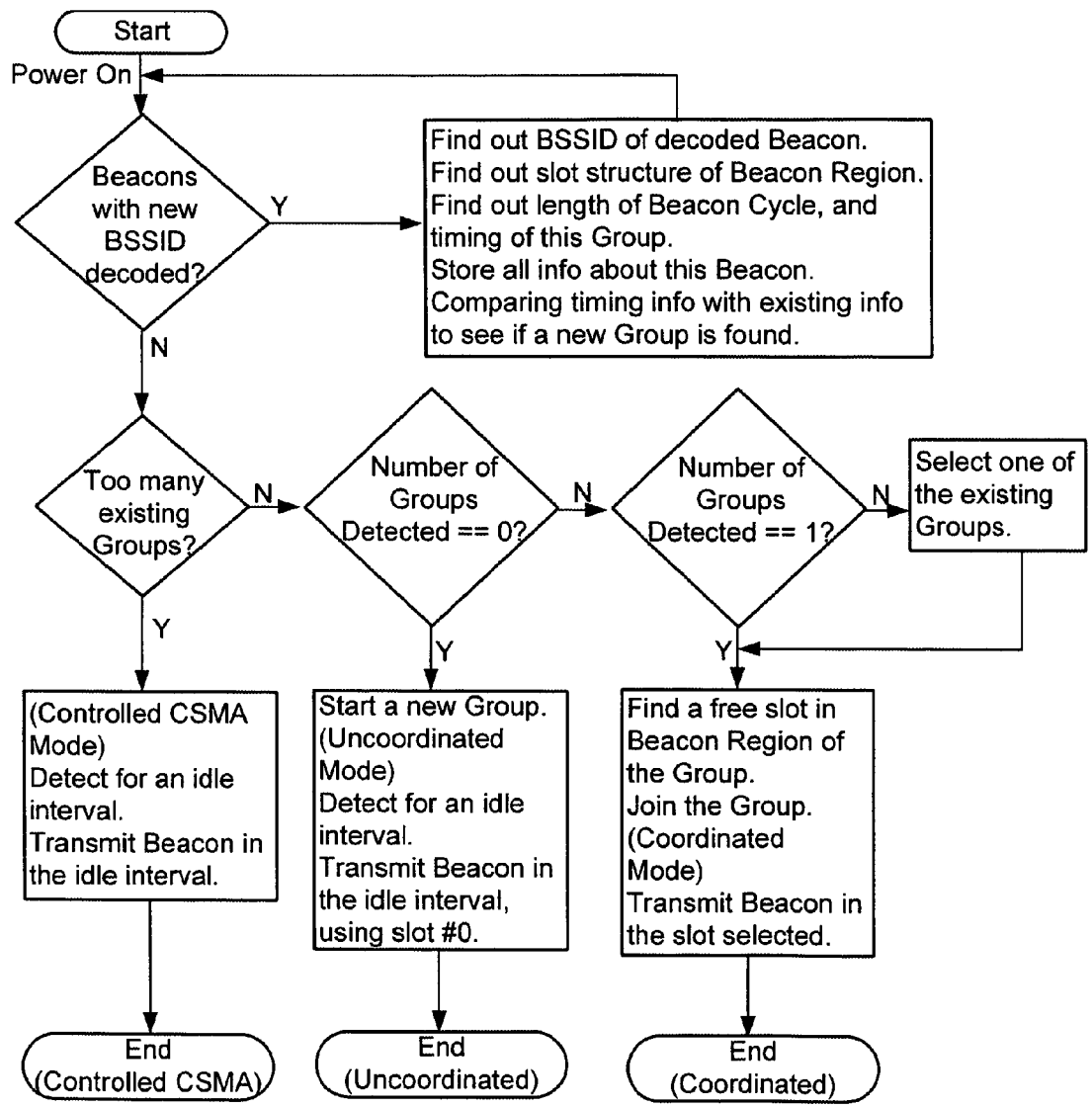
FIG. 3 is a chart showing an exemplary method for finding a group of BSSs.

In some embodiments of the present invention, a new QoSC may execute the following algorithm to find a Group of BSSs to join and a free slot in the Beacon Region to transmit its new Beacon. A flowchart of the algorithm is shown in FIG. 3.

For each Beacon decoded by the new QoSC,

Find out the BSSID which is the MAC address of the QoSC transmitting the Beacon, the slot structure of the Beacon Region, and also the length of the Beacon Cycle.

The length of the Beacon Cycle is equal to the sum of the duration of the Beacon Region and the "EndTime" field of the last Schedule Information in the Beacon.

Find out the time of the local clock when this Beacon is received. Together with the slot structure of the Beacon Region and the length of the Beacon Cycle, the system timing of the Beacon received can be determined as follows.

Let the time of the local clock when the Beacon was completely received be $t_r$. Then, the start time of the Beacon Region containing this Beacon was $t_b = t_r - (SlotID + 1) \cdot \tau - SlotID \cdot BIFS$, where SlotID is the slot number in which this Beacon was transmitted in and $\tau$ is the duration of the Beacon PDU. See FIG. 4 for an example. The system timing can be represented by $t_b + M \cdot T$, where M is an integer and T is the length of the Beacon Cycle.

Store the information obtained from this Beacon.

Check to see if the timing information (the start time of the Beacon Region and the length of Beacon Cycle) contained in this Beacon is the same as the information obtained from other Beacons so far.

If the timing information from two different Beacons is the same, it means the two Beacons are from the same Group of BSSs.

If the timing information from two different Beacons is different, it means the two Beacons are from two different Groups. (e.g., Example 4 in FIG. 5,)

Update the number of Groups detected so far. Also, record which of these Groups the current Beacon belongs to.

Repeat the above steps if Beacons with new BSSIDs can be decoded. Else if no new Beacons can be decoded, go to the next step.

If too many BSSs are detected,

Detect for an idle interval using CSMA.

Establish a new BSS by transmitting a new Beacon.

The new BSS shall operate in the Controlled CSMA Mode.

Else if no existing BSS is detected,

Detect for an idle interval using CSMA. The idle interval will become the Beacon Region of the new system.

Establish a new BSS by transmitting a new Beacon in slot #0 of the Beacon Region.

The new BSS shall operate in the Uncoordinated Mode (with limited or no Message Exchange).

Else if only one Group of BSSs is detected,

Find a free slot in the Beacon Region and transmit a new Beacon in that slot. A free slot is indicated by a "0" bit in the SlotUsage field of all Beacons belonging to the Group. If two or more free slots are available, the new QoSC will select one uniformly.

The new BSS shall operate in the Uncoordinated Mode (without Message Exchange).

Else if two or more Groups of BSSs are detected,

Select one Group to join. The new QoSC may select the Group uniformly, or based on criteria such as the number of BSSs in the Group, the averaged received signal strength of the Beacons, etc.

Find a free slot in the Beacon Region of the Group selected and transmit a new Beacon in that slot.

The new BSS shall operate in the Uncoordinated Mode (without Message Exchange).

Figure 5:
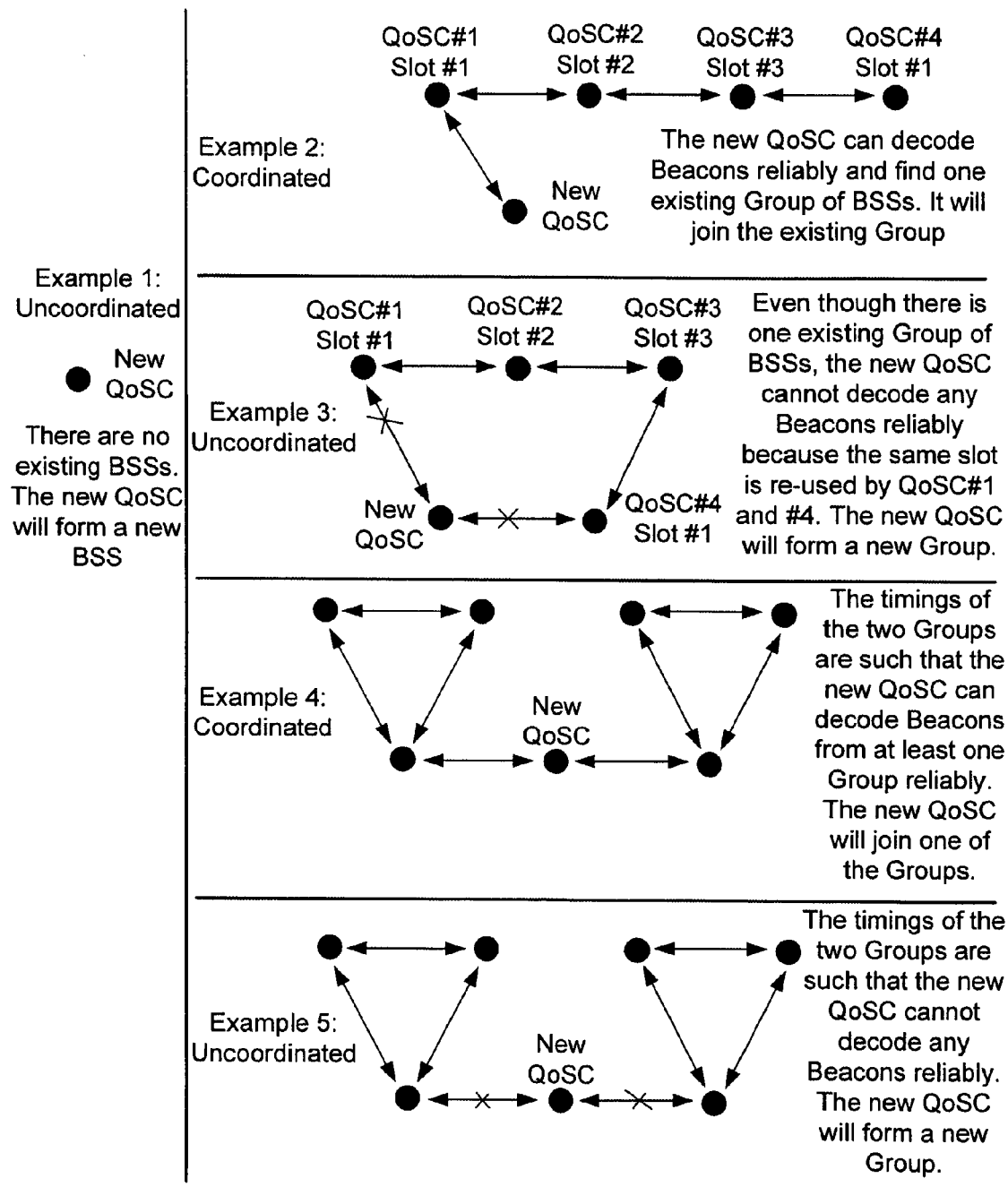
FIG. 5 is a chart showing exemplary BSS joining options.

Several network scenarios where the new QoSC may join an existing Group of BSSs using the Coordinated Mode or form a new independent BSS using the Uncoordinated Mode are shown in FIG. 5.

Join Example—One Group of BSSs Found

Figure 6:
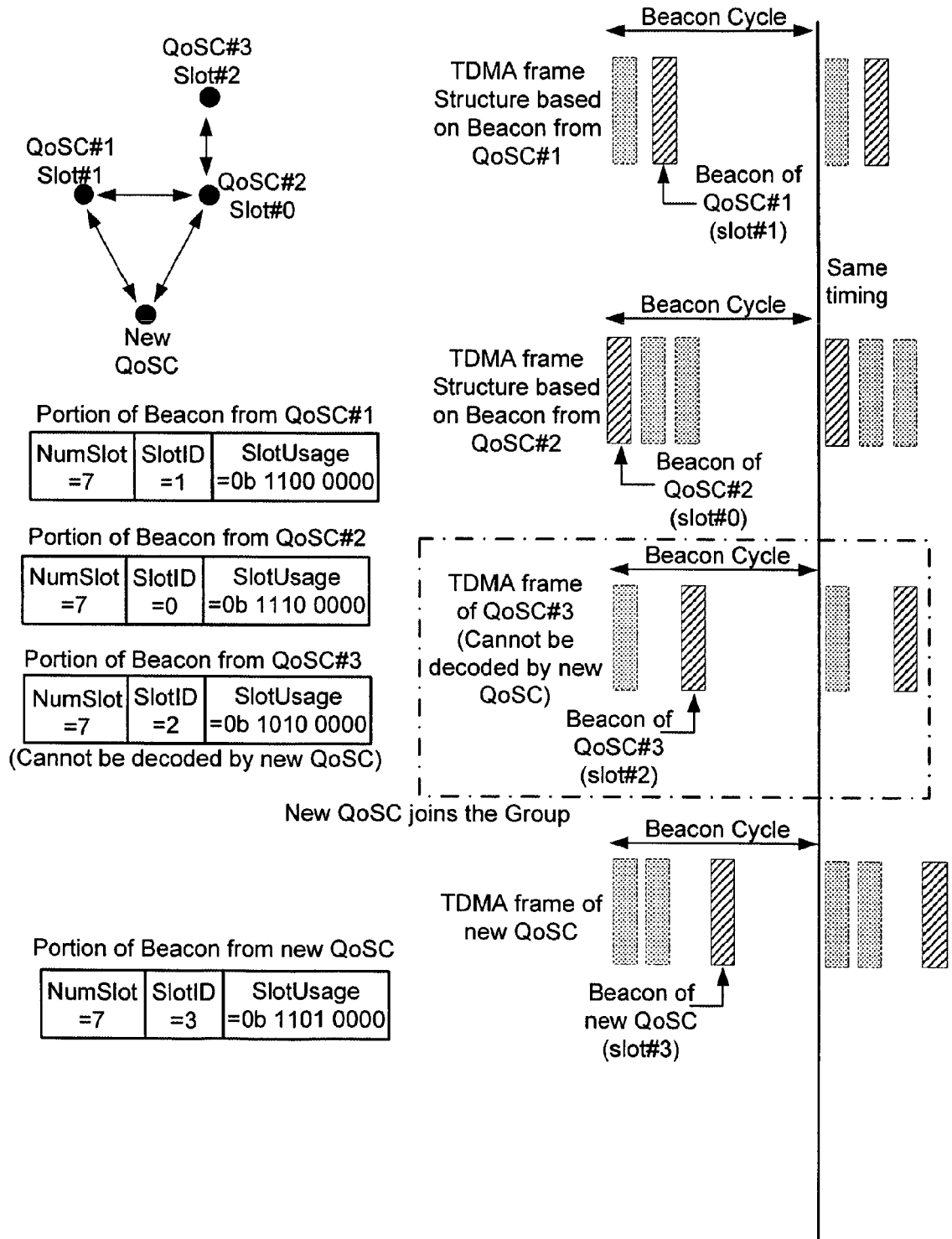
FIG. 6 is a chart showing an exemplary network scenario with one BSS group.

FIG. 6 shows an exemplary network scenario where the new QoSC can detect one Group of BSSs.

When the new QoSC decodes the Beacon from QoSC #1, it records the time of its local clock when the Beacon is received. Together with the slot structure of the Beacon Region and the length of the Beacon Cycle, the new QoSC knows the timing of QoSC #1. It also knows that slot #0 and slot #1 cannot be used to transmit its new Beacon if it decides to join this system later.

When the new QoSC decodes the Beacon from QoSC #2, it records the time of its local clock when the Beacon is received. Together with the slot structure of the Beacon Region and the length of the Beacon Cycle, the new QoSC knows the timing of QoSC #2. The new QoSC compares the timing of QoSC #2 with the timing of QoSC #1. In this case, the two timings are the same. The new QoSC deduces that the two BSSs are from the same Group. It also knows that slot #0, #1 and #2 cannot be used to transmit its new Beacon if it decides to join this system later.

In summary, the new QoSC has found one Group of BSSs, the timing of that Group, and that slots #0, #1, and #2 cannot be used. The new QoSC will join the existing Group in the Coordinated Mode. It will transmit its new Beacon in one of the slots between slot #3 and slot #7.

Suppose slot #3 is chosen. The new Beacon will indicate that slot #0, #1 and #3 are occupied.

After the new QoSC has joined the system, QoSC #1 and #2 will update the SlotUsage field in their Beacons to indicate that slot #3 is now occupied.

Join Example—Two Groups of BSSs Found

FIG. 7 shows an exemplary network scenario with two existing Groups of BSSs. The timings of the two Groups are different but the new QoSC can still reliably detect Beacons from both Groups.

When the new QoSC decodes the Beacon from QoSC #1, it records the time of its local clock when the Beacon is received. Together with the length of the Beacon Cycle, the new QoSC knows the timing of QoSC #1. It also knows that slot #0 cannot be used to transmit its new Beacon if it decides to join this system later.

When the new QoSC decodes the Beacon from QoSC #2, it records the time of its local clock when the Beacon is received. Together with the length of the Beacon Cycle, the new QoSC knows the timing of QoSC #2. The new QoSC compares the timing of QoSC #2 with the timing of QoSC #1. In this case, the two timings are different. The new QoSC knows that they are from two different Groups of BSSs. It also knows that slot #0 cannot be used to transmit its new Beacon if it decides to join this system later.

Finally, the new QoSC will decide to join one of the two Groups in the Coordinated Mode.

Suppose the new QoSC joins the Group with QoSC #1. The new QoSC shall specify a Protected Region in the same interval where the Beacon Region of QoSC #2 is located. As a result, there will be no transmissions from the new BSS (and its neighbors in the same Group) during that interval, and thus the Beacon Region of QoSC #2 is protected.

Similarly, when QoSC #2 receives the Beacons of the new QoSC, it shall specify a Protected Region in the same interval where the Beacon Region of the new QoSC is located.

Exemplary Handling of Collisions of New Beacons

If two or more new QoSCs simultaneously choose to use the same free Beacon slot to transmit their new Beacons, the existing QoSCs will not be able to decode any of the new Beacons reliably and therefore and they will not update their SlotUsage fields. The new QoSCs will then know that collisions have occurred and may choose to transmit their new Beacons again using a different Beacon slot.

Exemplary Setting of Contents of New Beacon

The new QoSC has to define the slot structure of the Beacon Region and the Schedule Information of the TDMA frame. In this subsection, the rules used by the new QoSC to set the contents of its new Beacon are described.

Exemplary Setting of Contents of Beacon Region

The new QoSC selects a free Beacon slot using the procedures described above and specifies the values of the NumSlot, SlotID and SlotUsage fields (see FIG. 2) in its new Beacons.

The value of the NumSlot field is set to 7 to indicate that there are 8 slots in the Beacon Region. The value of the SlotID field is set based on the free Beacon slot selected by the new QoSC.

The new QoSC should set a bit in the SlotUsage field to "1" if it can decode a neighbor Beacon transmitted in the corresponding Beacon slot. Otherwise, the bit is set to 0.

Figure 8:
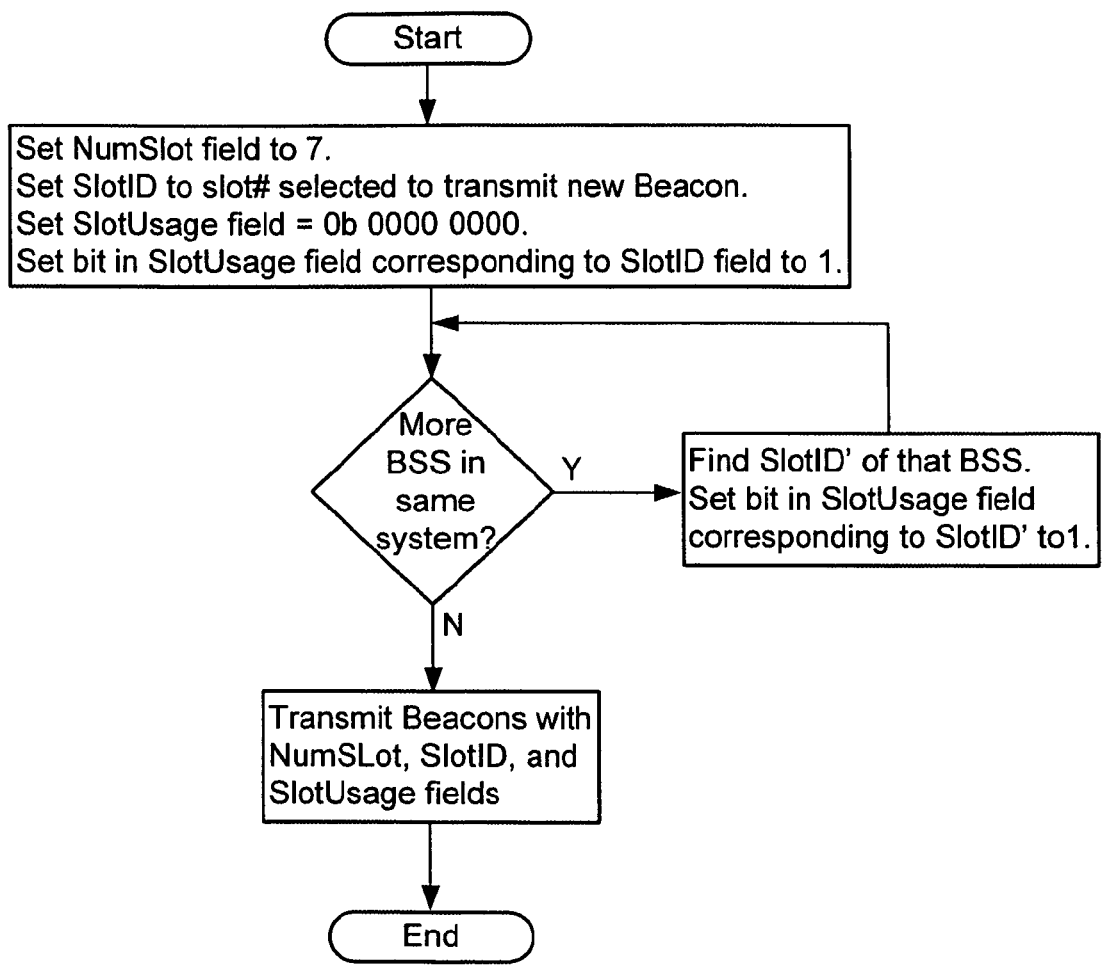
FIG. 8 is a chart showing an exemplary method for defining a slot structure of a Beacon Region.

An exemplary algorithm used to define the slot structure of the Beacon Region is, shown in the flowchart in FIG. 8.

Exemplary Setting of Contents of Schedule Information

If the new QoSC establishes a new network in the Uncoordinated Mode, then it should initially specify a CSMA Region for the entire Beacon Cycle.

On the other hand, if the new QoSC joins an existing Group of BSSs in the Coordinated Mode, the following procedures will be executed to compute the contents of its Schedule Information.

When a new QoSC first establishes a network, the Schedule Information in its Beacon should consist of CSMA Regions (TYPE=0), Stayout Regions (TYPE=4), and Protected Regions (TYPE=7) only. (The new QoSC should request to share bandwidth with other BSSs later using the procedures described herein.

Exemplary Union Allocation of Neighbors

The QoSC decodes all neighbor Beacons (from the same and different Groups) and computes the "union" of their allocations. For example, if one neighbor BSS specifies a Reserved Region and another neighbor specifies a CSMA or Stayout Region, then the resultant union allocation is a Reserved Region, because a Reserved Region "outweighs" both CSMA and Stayout Regions.

Figure 9:
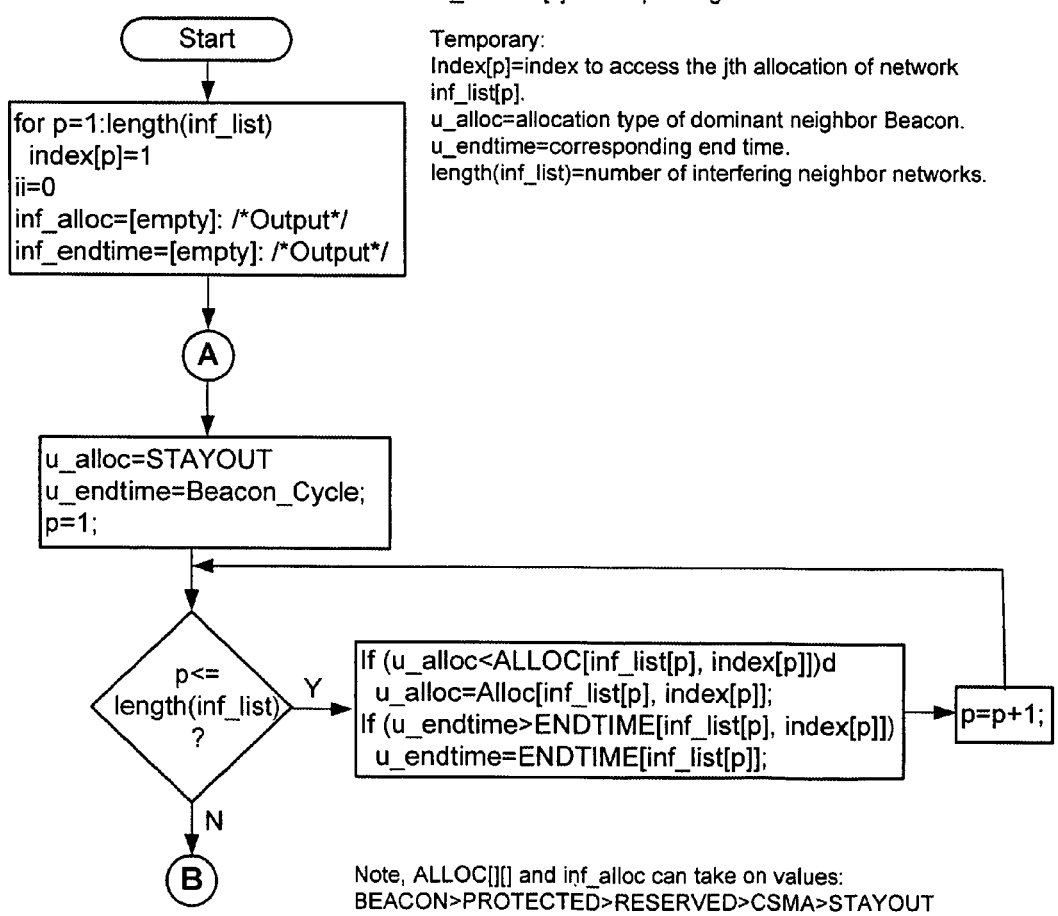
FIG. 9 is a chart showing an exemplary method of finding a union allocation of neighboring networks.
Figure 9A:
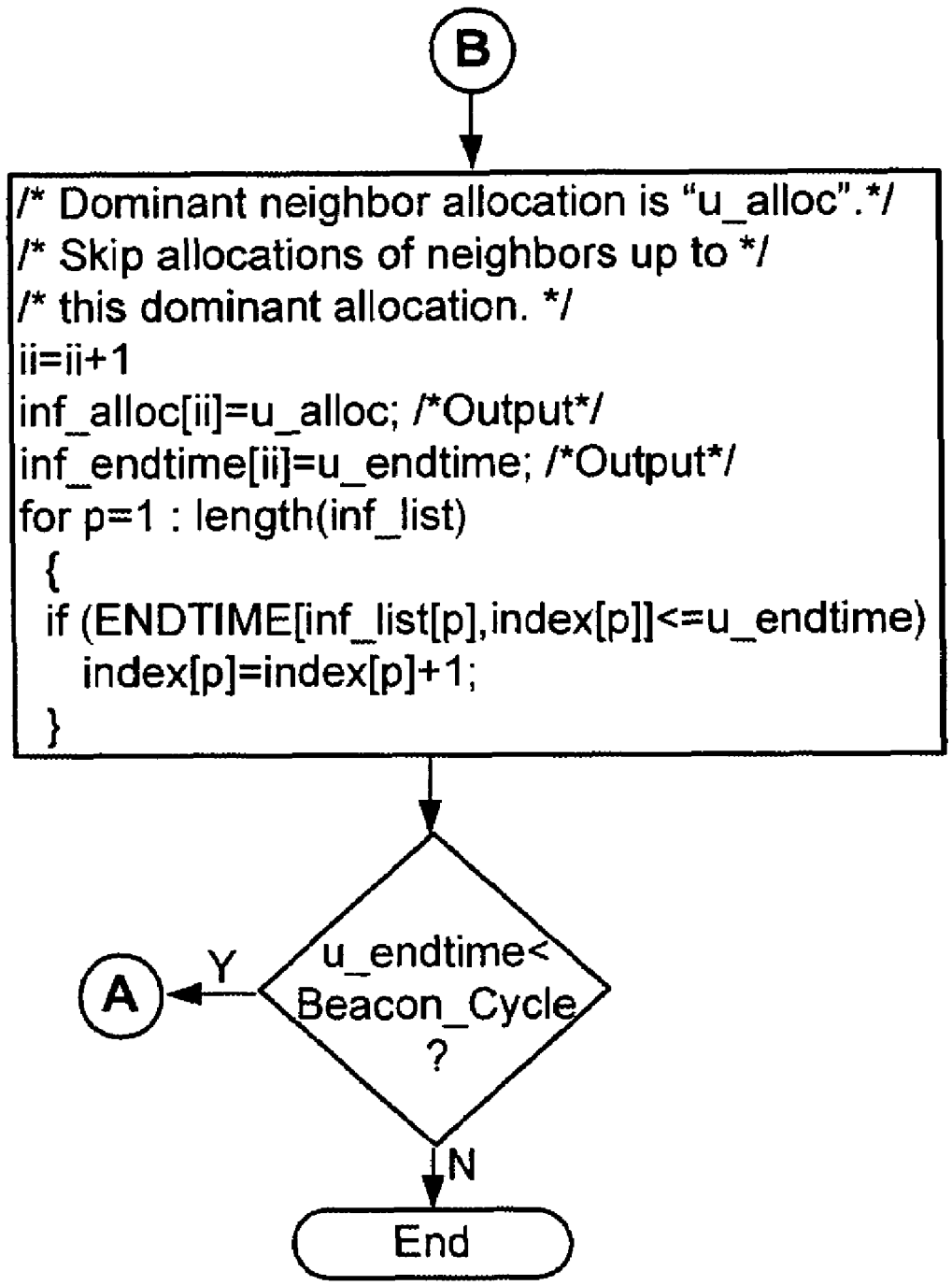

An exemplary algorithm used by a QoSC to compute the union allocation of all neighbors is given in FIG. 9. Note that in the algorithm, it is assumed that BEACON>PROTECTED>RESERVED>CSMA>STAYOUT in order to make the flowchart simpler, Note also that in all the flowcharts shown in the associated figures, the index of the first entry of an array is 1.

The inputs of the exemplary algorithm, ALLOC[n][i] and ENDTIME[n][i], are obtained from the Schedule Information of all neighbor Beacons, where "n" represents which neighbor network, and "i" represents which schedule for that neighbor network.

The entries, ALLOC[n][] and ENDTIME[n][], for each network are shifted to account for the difference in system timing. Beacon Regions are also inserted in ALLOC[n][] so that for networks that have the same timing as the QoSC, the first entry of ALLOC[n][] is a Beacon Region, and for a network that has a different timing from the QoSC, the Beacon Region is inserted in the appropriate entry of ALLOC [n][] to account for the timing difference. A corresponding entry is also inserted in ENDTIME[n][] to represent the duration of the Beacon Region.

Exemplary Schedule Information of New Beacon

Figure 10:
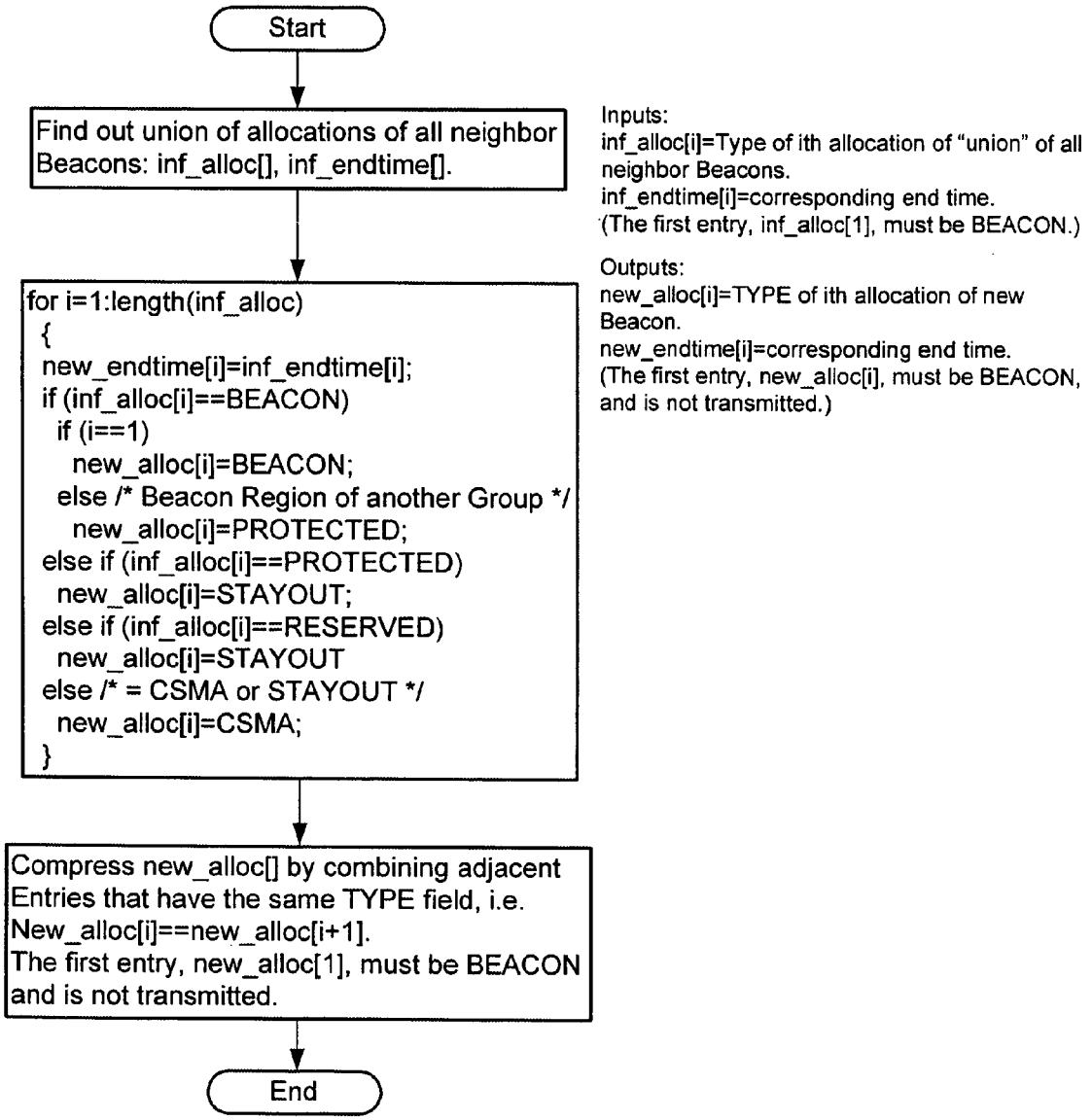
FIG. 10 is a chart showing an exemplary method for setting the contents of a Beacon.

Once the union allocation of all neighbors is computed, an exemplary algorithm to set the contents of the new Beacon when establishing a new network is given in FIG. 10. (It is applicable only when a new QoSC joins an existing Group in Coordinated Mode.)

The exemplary rules are:
If the neighbors specify a Beacon Region, then the new QoSC shall specify a Protected Region, except if it is the first entry, in which case the new QoSC shall also specify a Beacon Region.
Else if the neighbors specify a Protected Region or a Reserved Region, then the new QoSC shall specify a Stayout Region.
Otherwise, the new QoSC shall specify a CSMA Region in all other intervals.

The output may be represented by the arrays, new_alloc[] and new_endtime[]. The first entry, new_alloc[1], shall be a Beacon Region, and is not transmitted. The Schedule Information of the new Beacon is obtained by removing the first entry in the two arrays, and subtracting new_endtime[1] from the remaining entries of new_endtime[].

Figure 11:
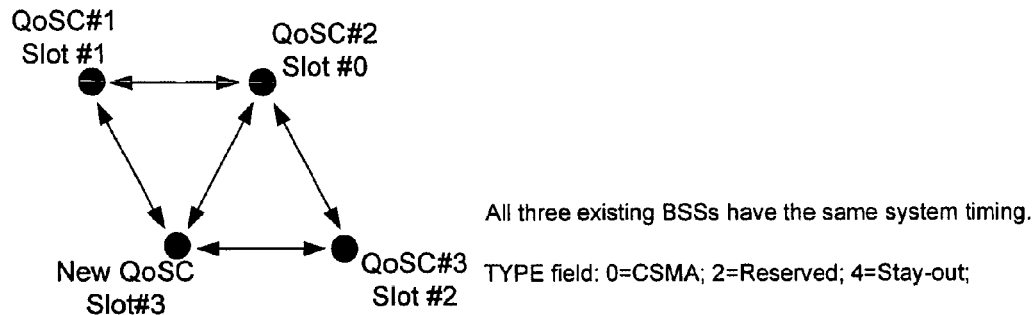
FIG. 11 is a chart showing an methods used when existing BSSs have the same system timing.
Figure 11:
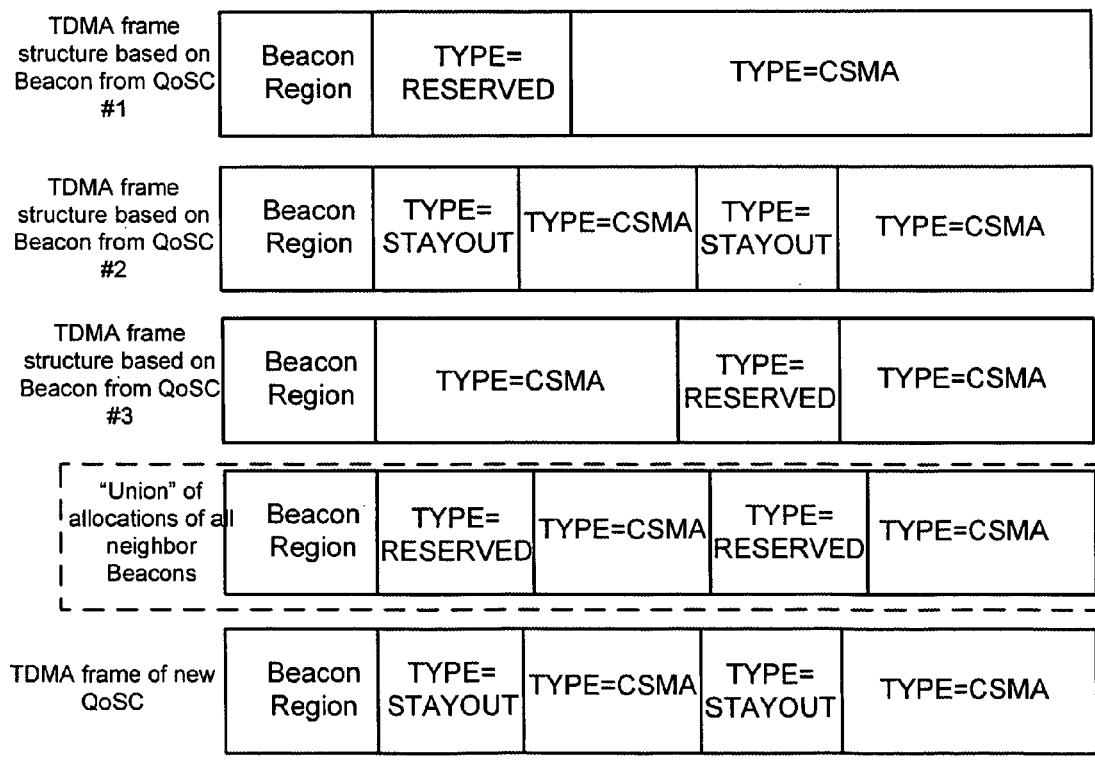
Figure 12:
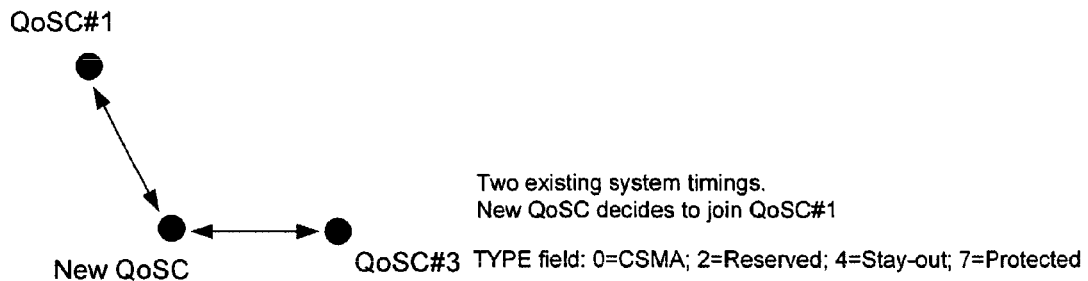
FIG. 12 is a chart showing exemplary methods for handling two existing groups.
Figure 12:
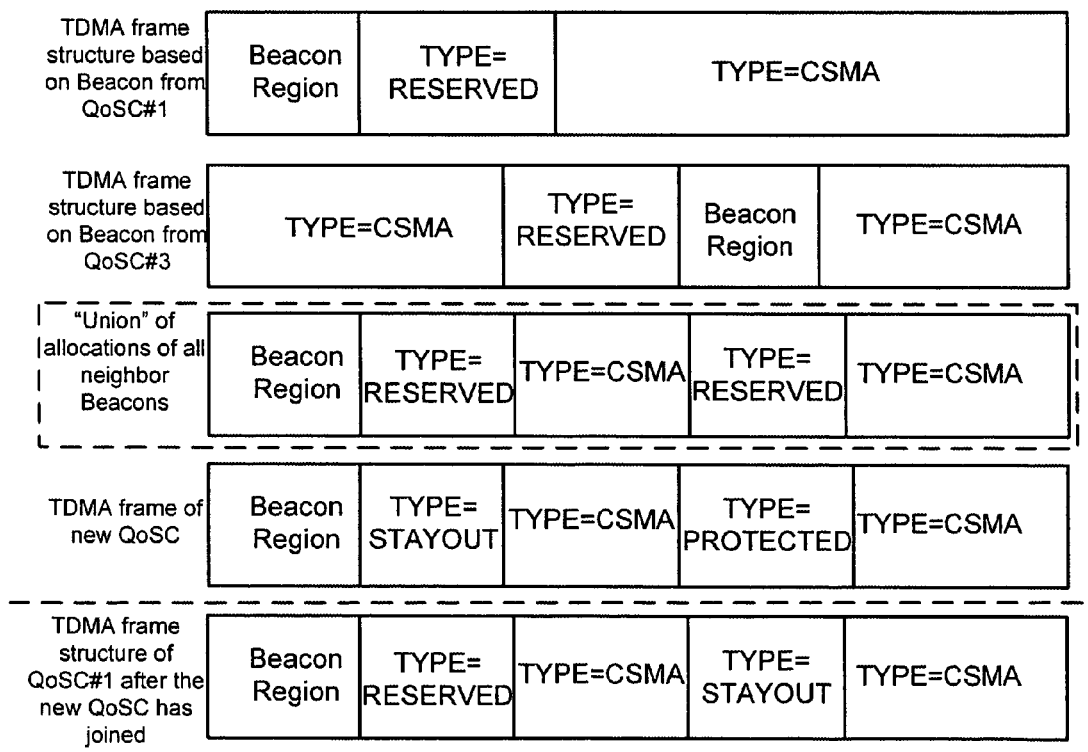

An example where all existing BSSs have the same system timing is given in FIG. 11. An example where there are two existing Groups is given in FIG. 12.

Exemplary Actions by Existing QoSCs

This subsection describes the actions that shall be taken by an existing QoSC in order to support the addition of a new QoSC to the system.

Exemplary Announcing of Slot Structure of Beacon Region

An existing QoSC may announce the slot structure of the Beacon Region through the NumSlot, SlotID, and SlotUsage fields. The SlotUsage field specifies the slots in the Beacon Region that are currently used by itself and its neighbors.

A new QoSC may use this information to find a free slot in the Beacon Region to transmit its new Beacons.

Exemplary Detecting of New Beacons in Beacon Region

An existing QoSC may detect for new Beacons in the free slots of its Beacon Region. If a new Beacon is detected, it means that a new QoSC has decided to join the same system. The existing QoSC shall decode the new Beacon and update the SlotUsage field in its own Beacon.

The existing QoSC shall also decode the Schedule Information of the new Beacon to see if there are any new Protected Regions. The presence of Protected Regions in the new Beacon suggests the existence of other independent systems in the vicinity. The existing QoSC shall specify a Stayout Region in the same interval where the new Beacon specifies a Protected Region, if the existing QoSC cannot detect that independent system itself. (Otherwise, the existing QoSC should have already specified a Protected Region.)

The exemplary algorithms described above may be used by the existing QoSCs to set the contents of their Beacons.

Exemplary Detecting of New Beacons in CSMA Region

An existing QoSC shall also detect for new Beacons in its CSMA Region. These new Beacons are transmitted by a new QoSC which has decided to join a Group with a different timing. The existing QoSC will find out the location of the Beacon Region of the new QoSC and specify a Protected Region in its own Beacon to coincide with it. Consequently, No stations of the existing BSS will transmit in the Protected Region.

The neighbor QoSC of the existing BSS will specify a Stayout Region in the same interval, if that neighbor QoSC cannot decode the new Beacon directly itself.

The exemplary algorithms described above may be used by the existing QoSCs to set the contents of their Beacons.

Exemplary Use of Dummy Beacon PDU

The new QoSC transmitting the new Beacon may or may not know the existence of any existing QoSCs. If the new QoSC specifies a Protected Region that coincides with the Beacon Region of an existing QoSC, it means that the new QoSC knows of the existence of that system. No further action is required by the existing QoSC in this case.

On the other hand, if the new QoSC does not specify a Protected Region in the same interval where the Beacon Region of an existing QoSC is located, it means that the new QoSC does not know of the existence of that existing QoSC. The existing QoSC shall send a Dummy Beacon PDU to the new QoSC. The purpose of the PDU is to inform the new QoSC of the existence of an existing Group and the offset between the two Beacon Regions.

Upon receiving the PDU, the new QoSC shall specify a Protected Region in its Schedule Information to protect the Beacon Region of the existing Group. As a result, both the existing QoSC and the new QoSC will be able to detect the Beacons of each other. The new QoSC will then change its Schedule Information to make it compatible with the existing QoSC.

The format of an exemplary Dummy Beacon PDU is shown below. The MAC addresses of the sender and the receiver are part of the header of the PDU, and therefore, are not required in the body of the PDU.

Offset Field. The Offset field specifies the time offset, in μsec, between Beacon Regions of the sender and the receiver. It is calculated as the start time of the sender's Beacon Region minus the start time of the receiver's Beacon Region (modulo Beacon Cycle). Its value shall be greater than or equal to 0 and less than the length of the Beacon Cycle.

Duration field. The Duration field specifies the duration, in μsec, of the Beacon Region of the sender. (This field is not needed if the length of the Beacon Region is fixed in the baseline technology specification.)

Exemplary Safeguard Mechanism

Note that if the new QoSC did not know of the existence of an existing QoSC when it first transmitted its new Beacon, the Schedule Information of the new Beacon may be incompatible with the Schedule Information of the existing QoSC. For example, a CSMA Region may be specified in the same interval where an existing QoSC has specified a Reserved Region.

The existing QoSC shall have a safeguard mechanism to maintain its current Schedule Information for a small number of Beacon Cycles while the new QoSC attempts to change its Schedule Information to make it compatible with the Schedule Information of the existing QoSC. Each QoSC maintains an array, ERR_COUNT[], for each of its allocations. Depending on the individual allocation type, the allocation may be allowed to be incompatible for a certain number of Beacon Cycles, denoted by MAX_ERR. (If MAX_ERR=1, it means that incompatibility is not allowed at all.) The use of this safeguard mechanism may be illustrated in the flowcharts given in FIGS. 14-17.

Similarly, if a neighbor Beacon cannot be decoded in the current Beacon Cycle, a previous copy of it will be used in all the algorithms. If it cannot be decoded for MAX_LOST Beacon Cycles in a row, then it is assumed that the neighbor BSS has been shutdown.

Exemplary Procedures for Sharing Bandwidth between BSSs

It is assumed that the BSSs have been up and running normally. The procedures for a QoSC, operating in coordinated mode with limited or no messaging, to share bandwidth with other BSSs are described in this Section.

Overview of Exemplary Operations

Figure 13:
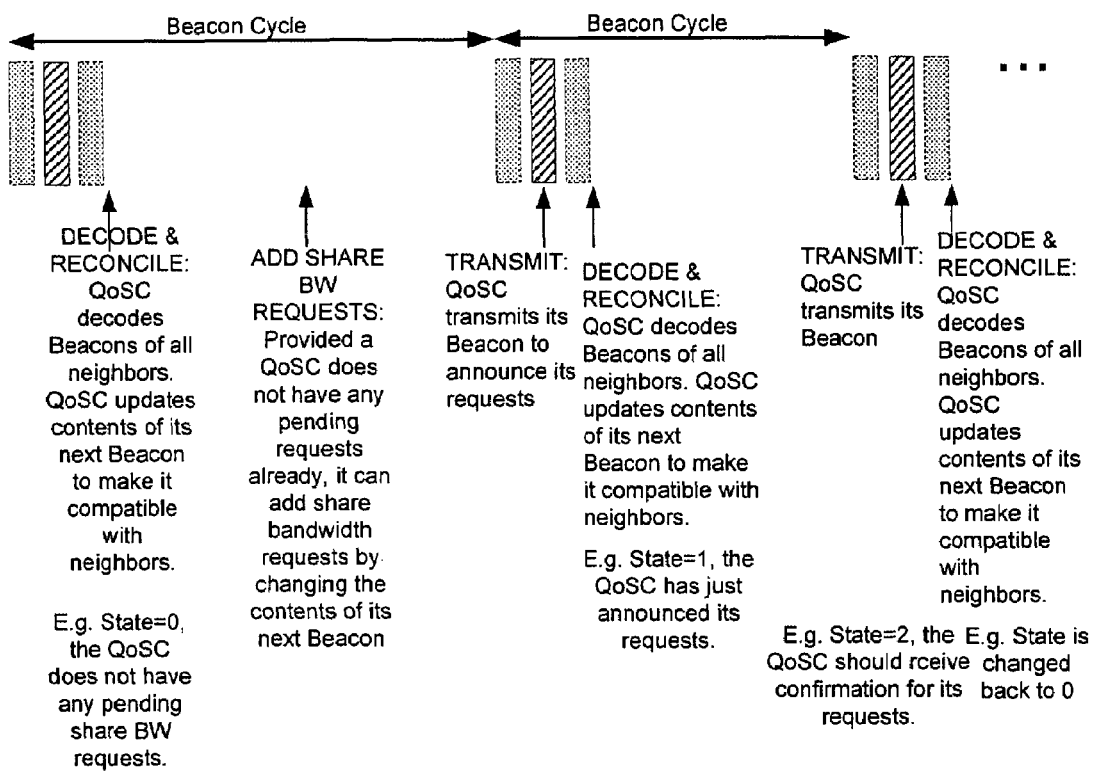
FIG. 13 is a chart showing exemplary methods for determining the contents of the next beacon.

An overview of some exemplary operations taken by a QoSC to determine the contents of its next Beacon is given in FIG. 13. The operations may comprise the following three steps:

Decode and Reconcile Beacons: The QoSC decodes the Beacons of all its neighbors in this step. As a result, the QoSC knows that if there are any changes in its neighbors' schedules (e.g., a neighbor may have announced a new bandwidth request or canceled an existing reservation), or if a new network with a different timing has been established. If the QoSC has announced a share bandwidth request in the previous frame, it also knows whether its neighbors have modified their schedules to accommodate its new request. In this step, the QoSC will compute the contents of its next Beacon to make all Beacons compatible.

Add Share Bandwidth Requests: Provided that the QoSC does not have any pending share bandwidth requests already, it can add share bandwidth requests in this step by changing the contents of its next Beacon obtained from the previous step.

Transmit New Beacon: The QoSC transmits its Beacon in the designated slot in the Beacon Region. The neighbors will find out any share bandwidth requests made by this QoSC when they decode this Beacon.

These three steps are repeated in each Beacon Cycle.

Exemplary Decode and Reconcile Beacons

In this step, the QoSC decodes the Beacons of all neighbor networks and computes the content of its next Beacon to make the contents of all Beacons compatible.

Firstly, the QoSC checks to see if any previously known neighbor Beacons can be decoded again in this Beacon Cycle. If a neighbor Beacon cannot be decoded, the QoSC will use a previously saved copy of that neighbor Beacon. However, if the neighbor Beacon is absent for MAX_LOST Beacon Cycles in a row, the QoSC will assume that neighbor network has been powered off. (Note: when a new QoSC wants to establish a new BSS, it shall be able to successfully decode each neighbor Beacon and shall not rely on any previously saved copy.)

Secondly, if the QoSC receives a neighbor Beacon with a different system timing that does not specify a Protected Region in the same interval where the QoSC has its Beacon Region, the QoSC will send a Dummy Beacon PDU to that neighbor QoSC.

Thirdly, the QoSC computes the union allocation of all neighbors.

Next, the QoSC runs an algorithm to set the contents of its next Beacon to make it compatible with all neighbor Beacons. A QoSC can be in one of three states. State=0 means that the QoSC does not have any pending new bandwidth requests. State=1 means that the QoSC has just announced its share bandwidth requests to its neighbors. Therefore, the neighbors cannot respond to the requests just yet. State=2 means that the QoSC should now receive confirmations for its share bandwidth requests from its neighbors. Depending on the State of the QoSC, different algorithms will be used.

If a QoSC wants to release a reserved bandwidth, it just needs to change its Reserved Regions into CSMA Regions. The neighbor QoSCs will run the same set of algorithms to update their next Beacons accordingly.

State=0

A QoSC does not have any pending share bandwidth requests when it is in State=0. The union allocations of all neighbor Beacons are denoted by inf_alloc[] and inf_endtime[]. A flowchart for computing the union allocations is given in FIG. 9.

The QoSC should keep a copy of its last Beacon, old_alloc[] and old_endtime[], and compute the contents of its next Beacon, new_alloc[] and new_endtime[].

If the QoSC's allocation in the previous Beacon is incompatible with the union allocation of all neighbors, the QoSC may need to change the allocation in its next Beacon.

For example, if the QoSC's previous allocation was a CSMA Region and it is now incompatible with its neighbors (e.g., the neighbor is specifying a Reserved Region), then the new allocation should become a Stayout Region. This case can happen when a neighbor has just announced a share bandwidth request.

If the QoSC's previous allocation was a Reserved Region and it has been incompatible with its neighbors (e.g., the neighbor is in a CSMA Region) for MAX_ERR Beacon Cycles in a row, then the new allocation should become a CSMA Region. The variable old_err_count[] is used to keep track of the number of Beacon Cycles for which each allocation has been incompatible. An updated version, new_err_count[], will be generated by the algorithm. This is the exemplary safeguard mechanism mentioned above.

Figure 14:
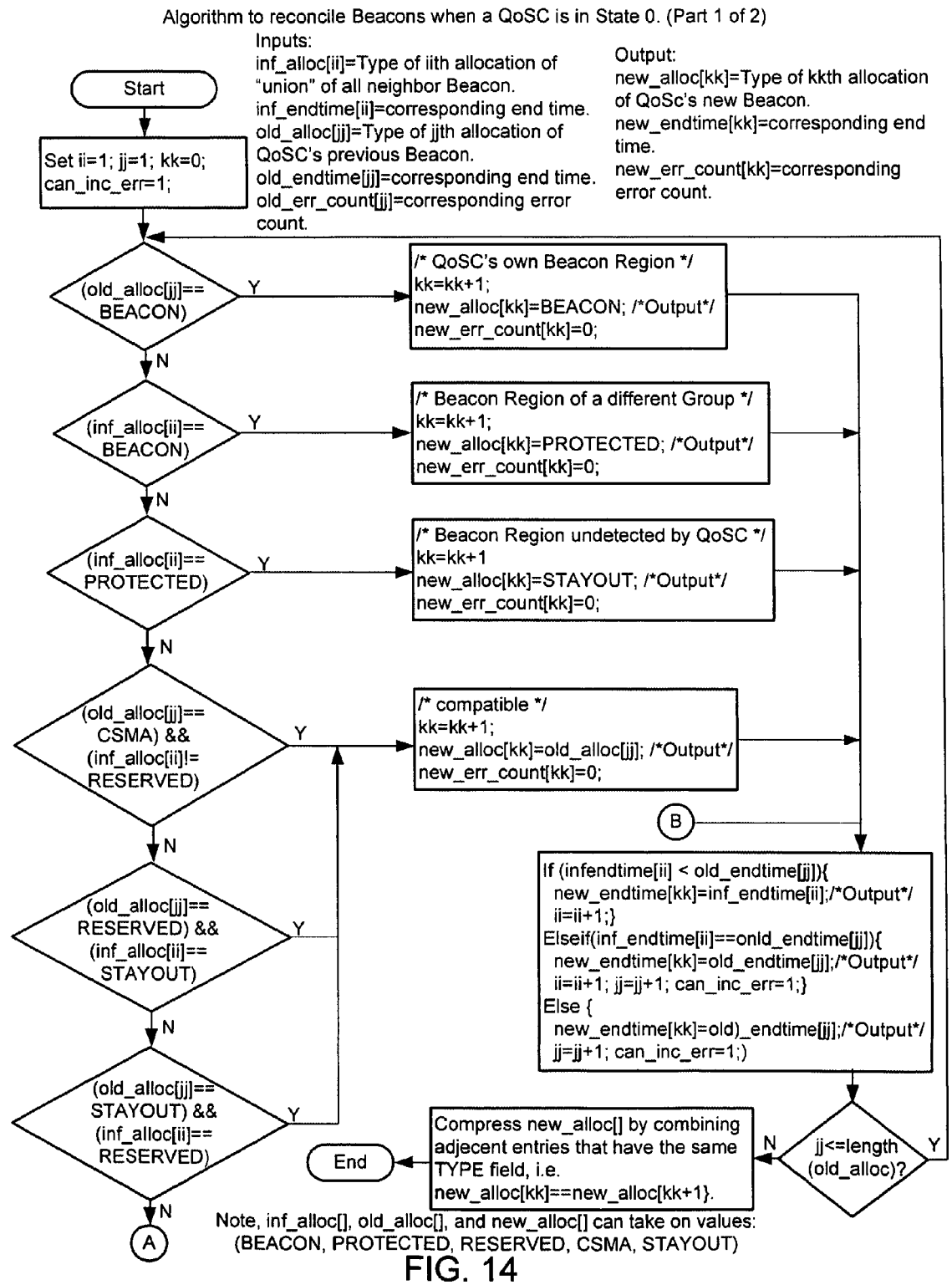
FIG. 14 is a chart showing an exemplary method for reconciling Beacons.
Figure 15:
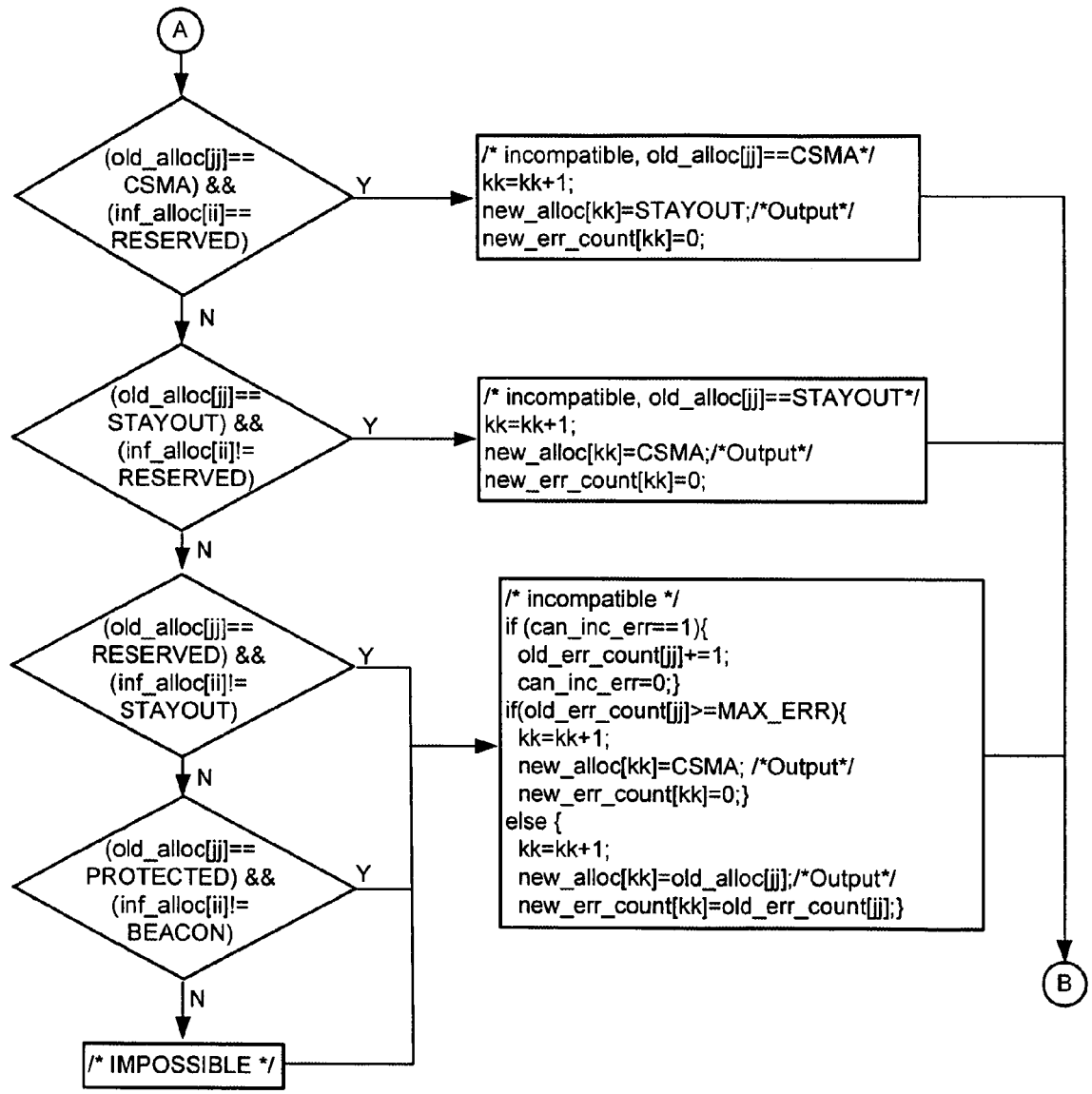
FIG. 15 is a chart showing an exemplary method for reconciling Beacons.

A flowchart of the algorithm when the QoSC is in State=0 is given in FIG. 14 and FIG. 15. Table 5 summarizes the rules when the QoSC is in State=0. The rules shall be executed in order, starting from rule #1.

State=1

A QoSC has just announced its share bandwidth requests to its neighbors when it is in State=1. However, the neighbors have not had time to respond to those requests yet.

The interval which the QoSC proposes to use is indicated by an internal TYPE field value of NEW_RESERVED. (The procedures for the QoSC to propose share bandwidth requests are given are described below. The internal TYPE field value of NEW_RESERVED is not actually transmitted. From the point of view of the neighbor, a TYPE field value of RESERVED will be received.) It is considered compatible as long as the neighbor does not specify a Reserved Region in that same interval.

On the other hand, if the neighbor also specifies a Reserved Region in the same interval where the QoSC specifies a New Reserved Region, it means that both the QoSC and the neighbor propose to use the same interval for their share bandwidth requests. Their requests will collide and they will cancel their requests by changing the allocation Type to a CSMA Region in the next Beacons.

At the end of the algorithm, if some of the share bandwidth requests of the QoSC still remain, the State is changed to 2. Otherwise, if all share bandwidth requests of the QoSC have been cancelled, the State is changed back to 0.

Figure 16A:
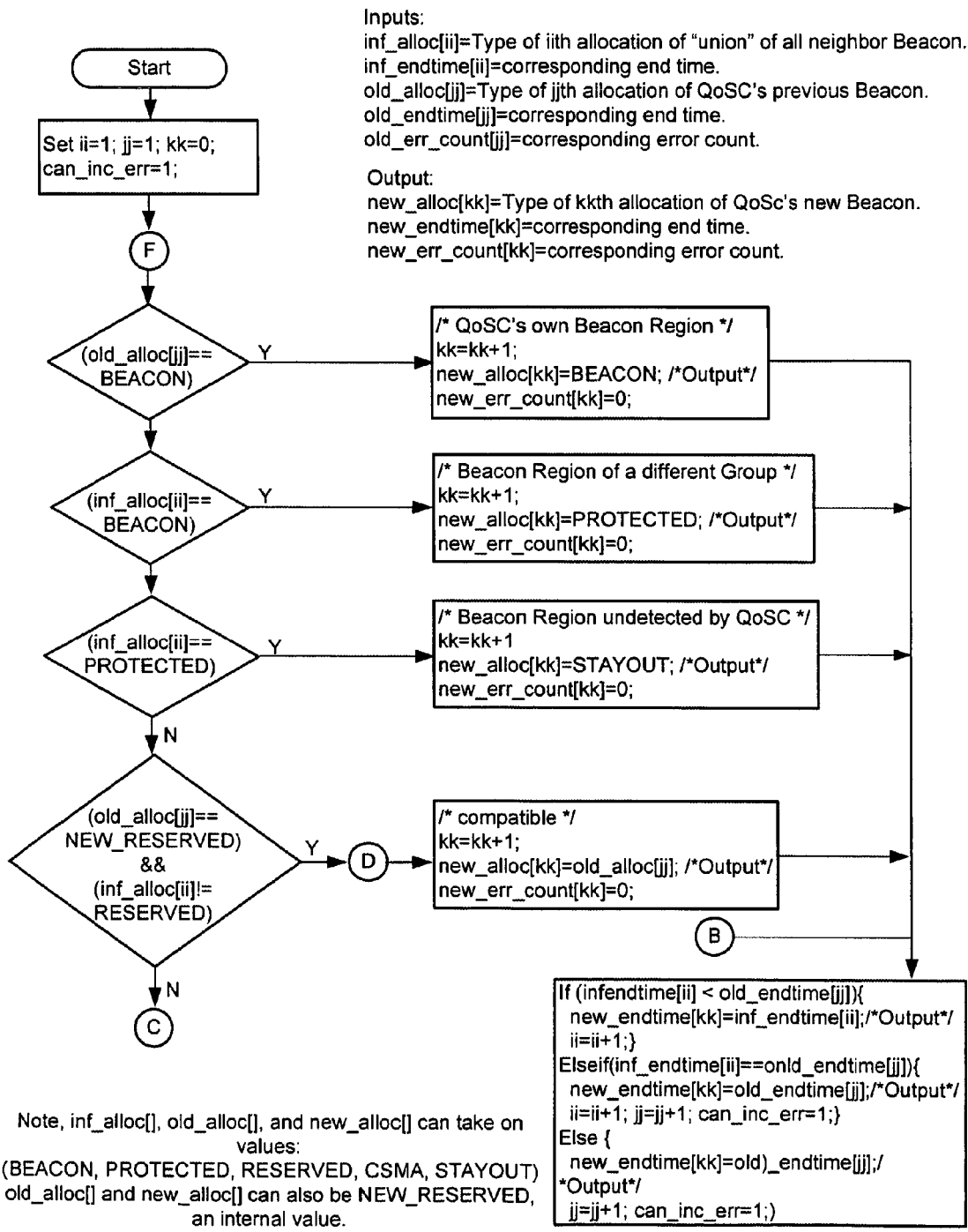
FIG. 16A is part one of a chart showing an alternative exemplary method for reconciling Beacons.
Figure 16B:
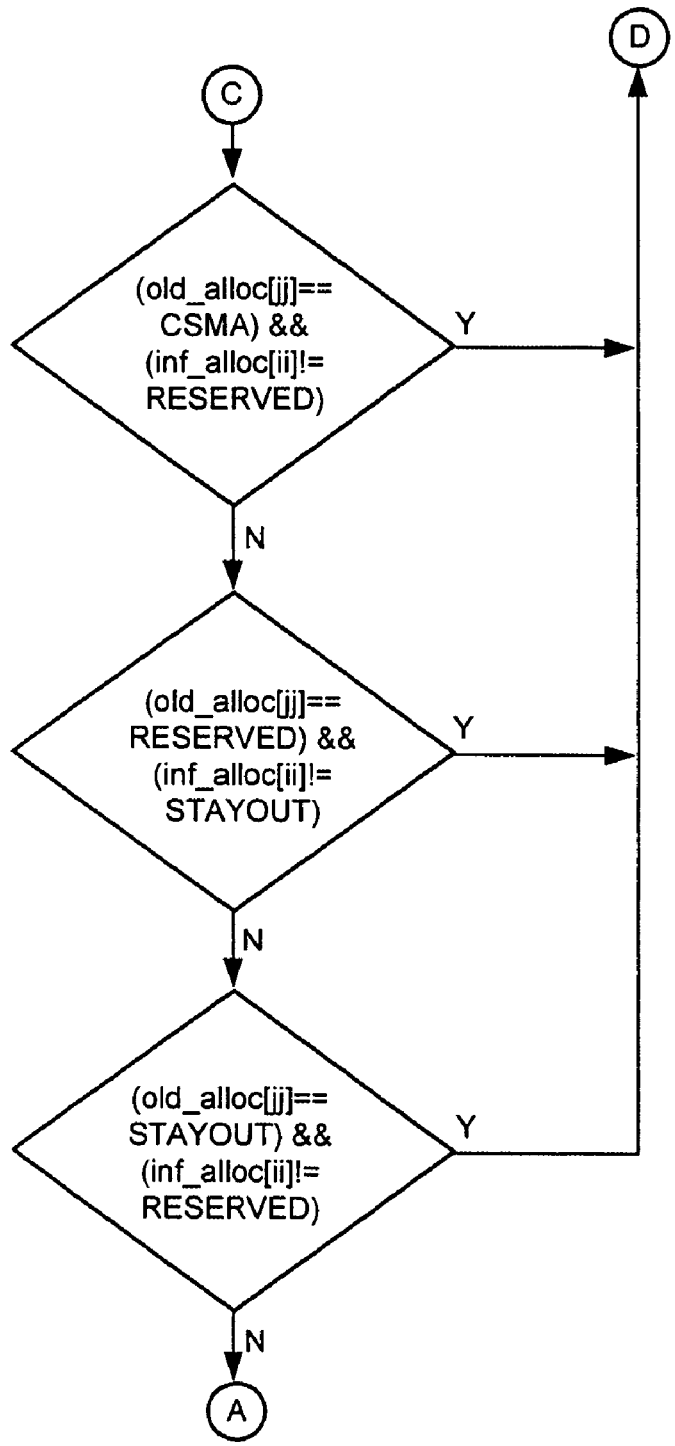
FIG. 16B is part two of a chart showing an alternative exemplary method for reconciling Beacons.
Figure 16C:
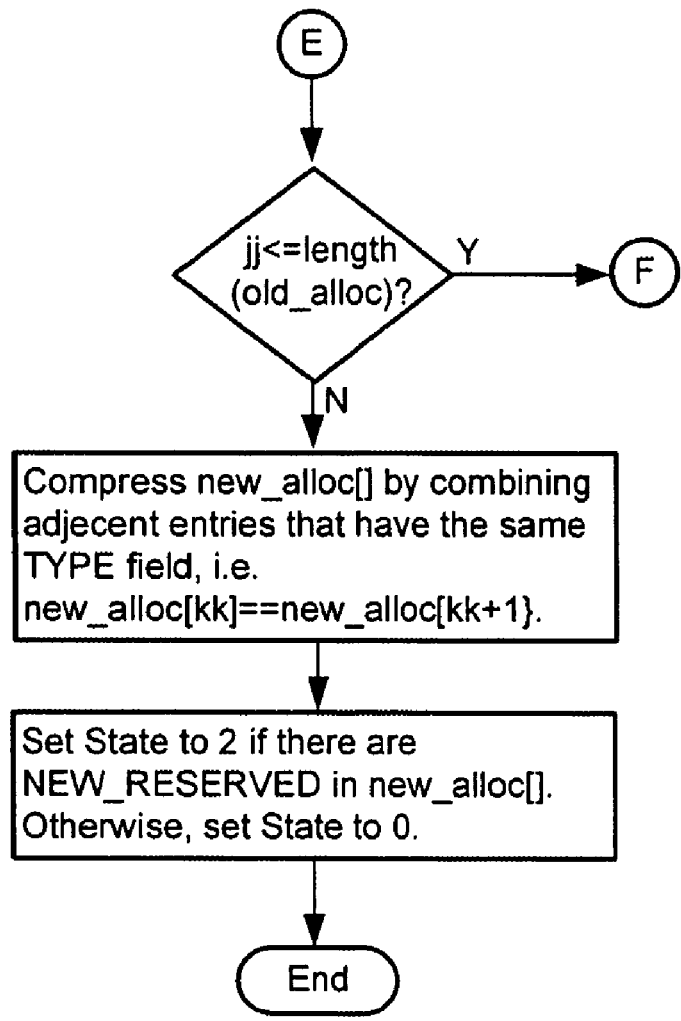
FIG. 16C is part three of a chart showing an alternative exemplary method for reconciling Beacons.
Figure 17:
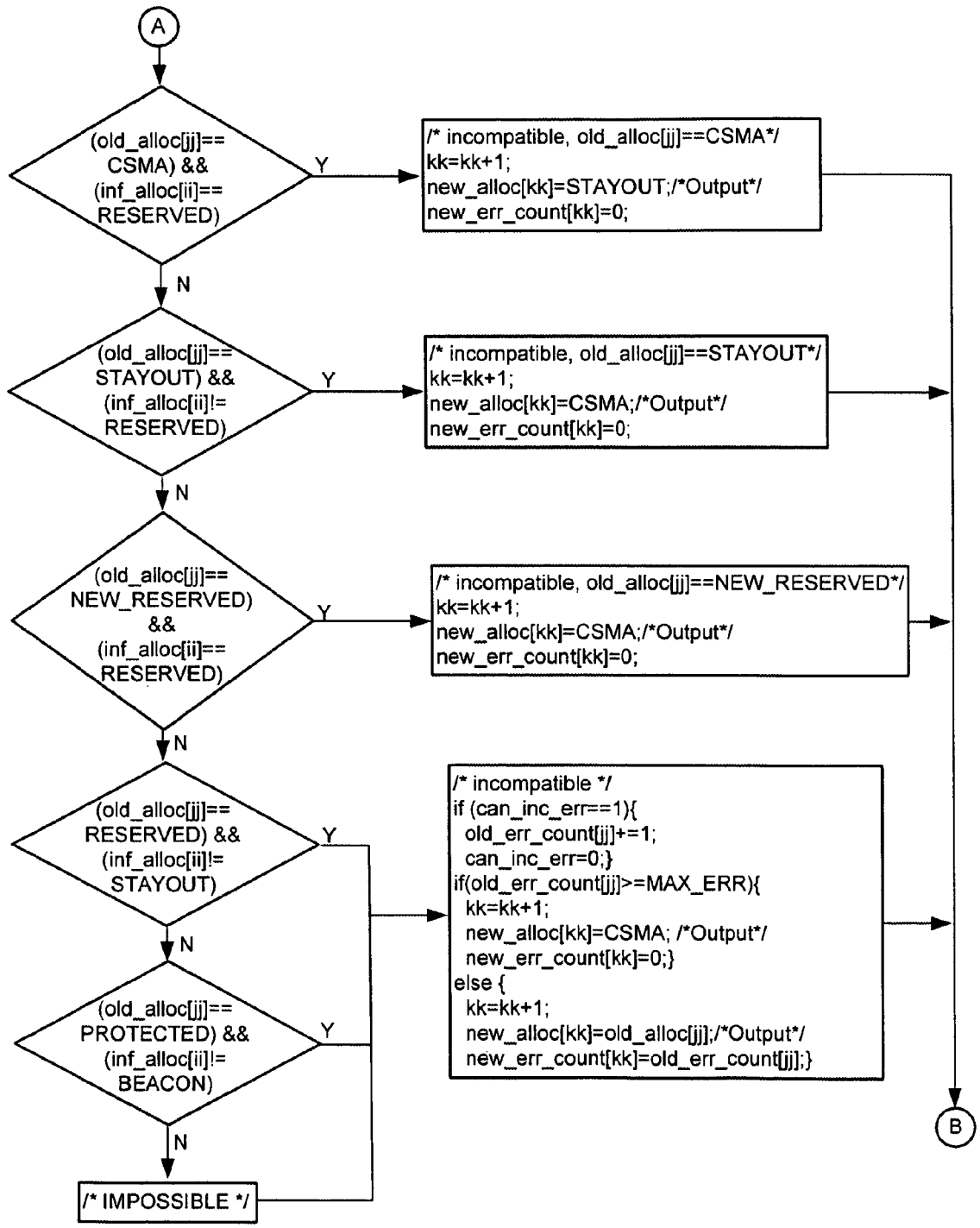
FIG. 17 is part four of a chart showing an alternative exemplary method for reconciling Beacons.
Figure 18A:
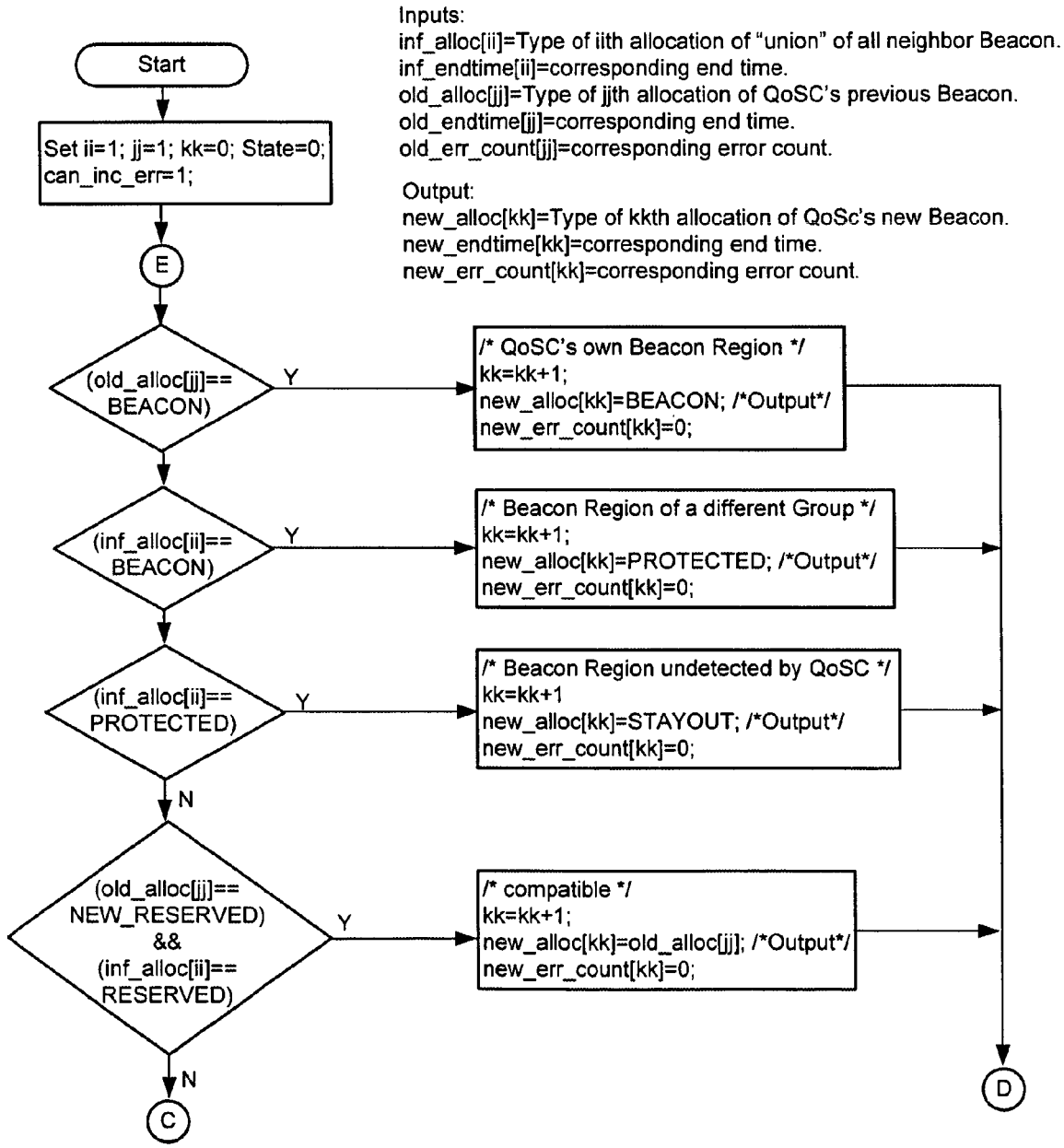
FIG. 18A is part one of a chart showing another alternative exemplary method for reconciling Beacons.
Figure 18B:
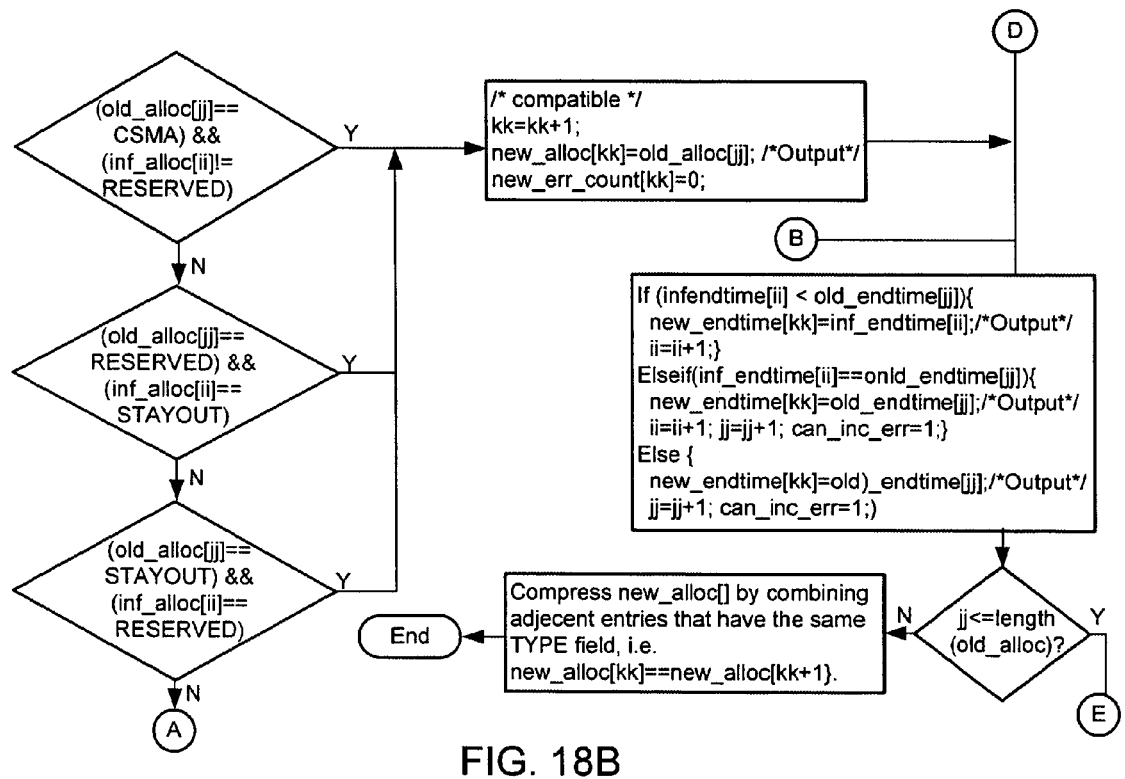
FIG. 18B is part two of a chart showing another alternative exemplary method for reconciling Beacons.
Figure 19:
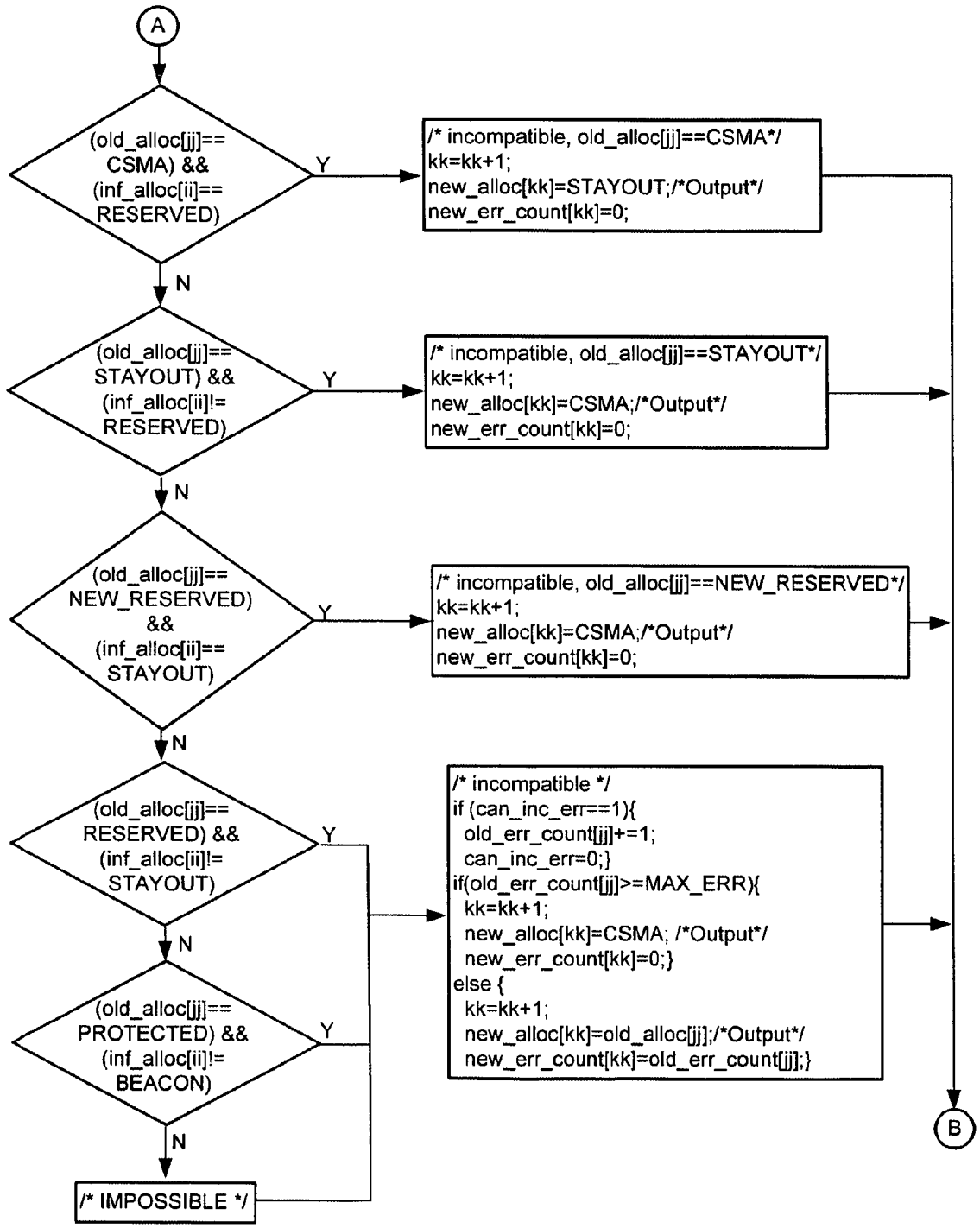
FIG. 19 is part three of a chart showing another alternative exemplary method for reconciling Beacons.

A flowchart of the algorithm for State=1 is given in FIG. 16 and FIG. 17. The rules are summarized in Table 6.

State =2

A QoSC has already announced its share bandwidth requests to its neighbors and is expecting responses from its neighbors when it is in State=2. The share bandwidth requests are accepted if the neighbors specify a Stayout Region in the same interval where the QoSC specified the requests. Otherwise, the requests are rejected and the QoSC shall withdraw the requests. In both cases, the QoSC will change its State back to 0.

Exemplary Add Share Bandwidth Requests

The steps taken by the QoSC to add share bandwidth requests are described in this Section. The QoSC shall be in State 0 initially, i.e., it does not have any pending requests. After executing the algorithm to reconcile the Beacons, the QoSC has computed the contents of its next Beacon, given by the arrays, new_alloc[] and new_endtime[].

The QoSC can propose to reserve any interval that has a TYPE field of CSMA in new_alloc[]. The QoSC will change the TYPE field value of the interval to NEW_RESERVED to indicate a "New Reserved Region."

Note that scheduling policy, if any, may be executed in this step as well.

The TYPE field value of NEW_RESERVED is used internally by the QoSC to distinguish a new request from an existing reservation. When the QoSC actually transmits its new Beacon, any value of NEW_RESERVED will be changed to RESERVED. Thus, the neighbors will receive TYPE field values of PROTECTED, RESERVED, CSMA, and STAYOUT only.

After a QoSC has transmitted its new Beacon with the proposed new requests, it will change its State to 1.

Note that if the QoSC only proposes to use a portion of a CSMA Region, it will split the original interval into two or three smaller intervals. One of the intervals will have a TYPE field of NEW_RESERVED and the remaining interval(s) will have a TYPE field of CSMA.

Exemplary Transmit New Beacon

The QoSC has already computed the contents of its new Beacon, new_alloc[] and new_endtime[]. It will convert all TYPE field values of NEW_RESERVED to RESERVED, and transmit the resultant Schedule Information in the appropriate Beacon slot.

If the QoSC is initially in State 0 and it is announcing share bandwidth requests in the new Beacon, it will change its State to 1, so that it will use the algorithm described in relation to State 1 to reconcile the neighbor Beacons next time.

Exemplary Share Bandwidth Request Examples Success

Figure 20:
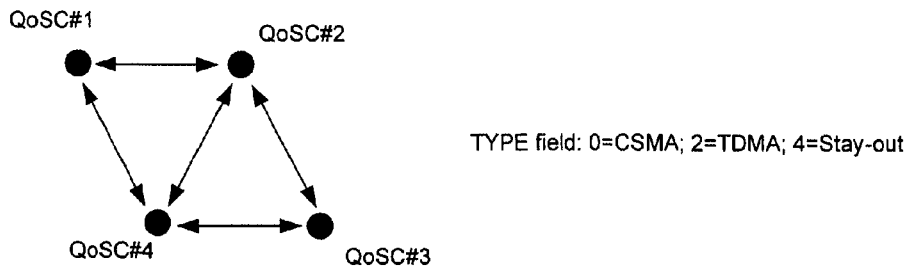
FIG. 20 is a chart showing exemplary field types.

An example showing how a QoSC requests for sharing bandwidth successfully is given in FIG. 20.

Frame N shows the original TDMA frame structure of all the QoSCs.

QoSC #4 wants to request for sharing bandwidth. After decoding its neighbor Beacons, it chooses an available interval for its new Reserved Region.

In Frame (N+1), QoSC #4 signals to its neighbors the interval it wants to reserve (TYPE=2).

The neighbors of QoSC #4 detect a new Reserved Region in the Schedule Information of QoSC #4. They will change their Beacons in the next Frame to include a new Stayout Region (TYPE=4).

In Frame (N+2), the neighbors of QoSC #4 update their Beacons to include a new Stayout Region.

After decoding the neighbor Beacons of Frame (N+2), QoSC #4 knows that its new request has been accepted.

From Frame (N+3) onwards, QoSC #4 can assign its new Reserved Region to its stations.

Collision

Figure 21:
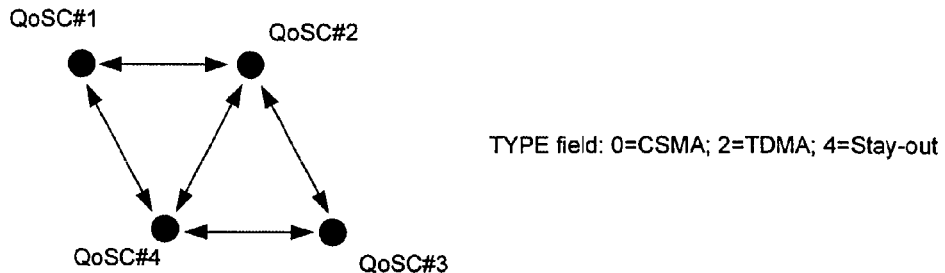
FIG. 21 is a chart showing additional exemplary field types.

An example showing the requests of two QoSCs partially colliding is given in FIG. 21.

Frame N shows the original TDMA frame structure of all the QoSCs.

Both QoSC #1 and #4 want to request for sharing bandwidth. After decoding their neighbor Beacons, they each choose an available interval for their new Reserved Regions.

In Frame (N+1), QoSC#1 and #4 signal to their neighbors the intervals they wants to reserve (TYPE=2). Note that the two intervals chosen overlap partially.

QoSC #2 can detect the requests of QoSC #1 and #4, and it will change its Beacon in the next Frame to include a Stayout Region that will cover both requests.

QoSC #3 can detect only the request of QoSC #4, and it will change its Beacon in the next Frame to include a Stayout Region for that request only.

QoSC #1 can detect a new request from QoSC #4. It knows that the request from QoSC #4 collides partially with its own request. Therefore, it will change its Beacon in the next Frame to cancel a portion of its request. In addition, it will include a Stayout Region for the non-colliding portion of QoSC #4's request.

Similarly, QoSC #4 will cancel a portion of its request in the next Frame, and include a Stayout Region.

In Frame (N+2), the QoSCs transmit their Beacons computed in the previous step. When the QoSCs receive all the Beacons of Frame (N+2), QoSC #2 and #3 detect that the durations of the requests of QoSC #1 and #4 are reduced. They will update their Stayout Regions in their next Beacons accordingly.

QoSC #1 and #4 detect that all their neighbors have specified a Stayout Region to accommodate their requests. They can assign its new Reserved Region to its stations in the next Frame. The QoSCs may also want to request for additional bandwidth because a portion of their original request was canceled.

Exemplary Scheduling Policy

When a QoSC proposes a new allocation to its neighbor QoSCs, a set of rules comprising the following rules may be enforced.

1. A QoSC shall specify a Stayout Region in the same interval that is reserved by one or more of its neighbor QoSCs.
2. Each BSS shall maintain a certain minimum Contention Period in each Beacon Cycle to allow exchanges of messages between the QoSC and its stations.
3. Interfering BSSs shall maintain a certain minimum common Contention Period in each Beacon Cycle to allow exchanges of messages between neighbor QoSCs. (Applicable only if operating in the Coordinated Mode with Message Exchange.)
4. An optional rule may be to restrict the duration of Reserved Regions of a BSS to a certain value. For example, if a BSS has two interfering neighbor BSSs, then the total duration of its Reserved Regions may be limited to 33% of the Beacon Cycle.

If Rules #1, #2, and #3 (if applicable) are used, then the scheduling policy is a First-Come-First-Served one.

Rule #4 is a form of admission control.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for coordinating potentially-interfering networks, said method comprising:
   a) initializing a first network, wherein said initializing comprises decoding all existing network beacons received at said first network during said initializing and determining an interfering network list associated with said first network from said decoded network beacons
   b) receiving, at said first network, a second-network beacon from a second network, wherein said first network and said second network are neighboring networks;
   c) decoding, at said first network, said second-network beacon to ascertain network scheduling information for said second network;
   d) adjusting bandwidth assignments for said first network to coordinate with said network scheduling information for said second network; and
   e) based on said network scheduling information for said second network, updating said interfering network list associated with said first network.

2. A method as described in claim 1 wherein said network scheduling information for said second network comprises scheduled transmission periods for said second network.

3. A method as described in claim 1 wherein said network scheduling information for said second network comprises device identification and device bandwidth allocations.

4. A method as described in claim 1 wherein said adjusting comprises releasing bandwidth previously reserved by said first network.

5. A method as described in claim 1, wherein said determining, said receiving, said decoding, said adjusting and said updating are performed by a controlling authority for said first network.

6. A method as described in claim 5, wherein said controlling authority is a Quality of Service Controller (QoSC) for said first network.

7. A method as described in claim 1, wherein said receiving, said decoding and said adjusting are performed by a controlling authority for said first network.

8. A method as described in claim 7, wherein said controlling authority is a Quality of Service Controller (QoSC) for said first network.

9. A method as described in claim 1 further comprising:
a) receiving, at said first network, a third-network beacon from a third network, wherein said first network and said third network are neighboring networks;
b) decoding, at said first network, said third-network beacon to ascertain network scheduling information for said third network;
c) adjusting bandwidth assignments for said first network to coordinate with said network scheduling information for said third network; and
d) based on said scheduling information for said third network, updating said interfering network list associated with said first network.

10. A method as described in claim 9, wherein said adjusting bandwidth assignments for said first network to coordinate with said network scheduling information for said second network and said adjusting bandwidth assignments for said first network to coordinate with said network scheduling information for said third network comprises forming the union of said network scheduling information for said second network and said network scheduling information for said third network.

* * * * *